United States Patent
Okamoto et al.

(10) Patent No.: US 12,174,637 B1
(45) Date of Patent: Dec. 24, 2024

(54) SYSTEMS AND METHODS FOR SPATIALLY CONTROLLED ACCELERATION AND DECELERATION

(71) Applicant: Zoox, Inc., Foster City, CA (US)

(72) Inventors: Kazuhide Okamoto, Mountain View, CA (US); Jacob Patrick Thalman, San Francisco, CA (US); Olivier Amaury Toupet, Escondido, CA (US)

(73) Assignee: Zoox, Inc.

( * ) Notice: Subject to any disclaimer, the term of this patent is extended or adjusted under 35 U.S.C. 154(b) by 265 days.

(21) Appl. No.: 17/957,299

(22) Filed: Sep. 30, 2022

(51) Int. Cl.
*G05D 1/00* (2024.01)

(52) U.S. Cl.
CPC ......... *G05D 1/0223* (2013.01); *G05D 1/0094* (2013.01); *G05D 1/0214* (2013.01)

(58) Field of Classification Search
CPC .. G05D 1/0223; G05D 1/0094; G05D 1/0214; G05D 1/0088; B60W 2420/403
See application file for complete search history.

(56) References Cited

U.S. PATENT DOCUMENTS

| | | | |
|---|---|---|---|
| 10,133,275 B1 | 11/2018 | Kobilarov et al. | |
| 12,055,621 B2* | 8/2024 | Yang | G01S 13/931 |
| 2006/0082922 A1* | 4/2006 | Shih | G11B 5/5547 |
| | | | 360/78.09 |
| 2017/0183004 A1* | 6/2017 | Bonarens | B60W 10/20 |
| 2019/0186948 A1* | 6/2019 | Hayee | B60Q 9/00 |
| 2020/0356100 A1* | 11/2020 | Nagarajan | G01C 21/3602 |
| 2020/0363806 A1 | 11/2020 | Kobilarov | |
| 2021/0323573 A1* | 10/2021 | Gogna | G01C 21/3407 |
| 2023/0347880 A1* | 11/2023 | Clawson | G06V 20/58 |

* cited by examiner

*Primary Examiner* — George C Jin
(74) *Attorney, Agent, or Firm* — Lee & Hayes, P.C.

(57) ABSTRACT

Systems and techniques for determining acceleration controls to use in a trajectory for use in controlling a vehicle are described. An acceleration determination system may receive a trajectory from a trajectory determination system and determine, based on various vehicle, acceleration, and spatial trajectory parameters, the appropriate controls to configure in a longitudinal profile of the trajectory and the suitable spatial implementation points for implementing the controls within acceleration rate change constraints. An operational trajectory determination system may determine a trajectory for use in operating the vehicle using one or more candidate trajectories and/or associated data, including one or more acceleration controls determined by the acceleration determination system.

20 Claims, 6 Drawing Sheets

SYSTEMS AND METHODS FOR SPATIALLY CONTROLLED ACCELERATION AND DECELERATION

BACKGROUND

Vehicles may be equipped with a trajectory planning system that determines an operational trajectory for the vehicle that may be used to control a vehicle as it travels within an environment. Vehicles may also be equipped with systems used to detect objects in an environment and control the vehicle to avoid the objects. A vehicle traveling through an environment using such a trajectory may decelerate as it travels in the environment, for example when approaching a planned stopping point or experiencing an unexpected event, such an unexpected obstacle entering the path of the vehicle or a vehicle malfunction. Maintaining passenger comfort and safety while continuing to safely operate a vehicle during deceleration may, at times, present challenges.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
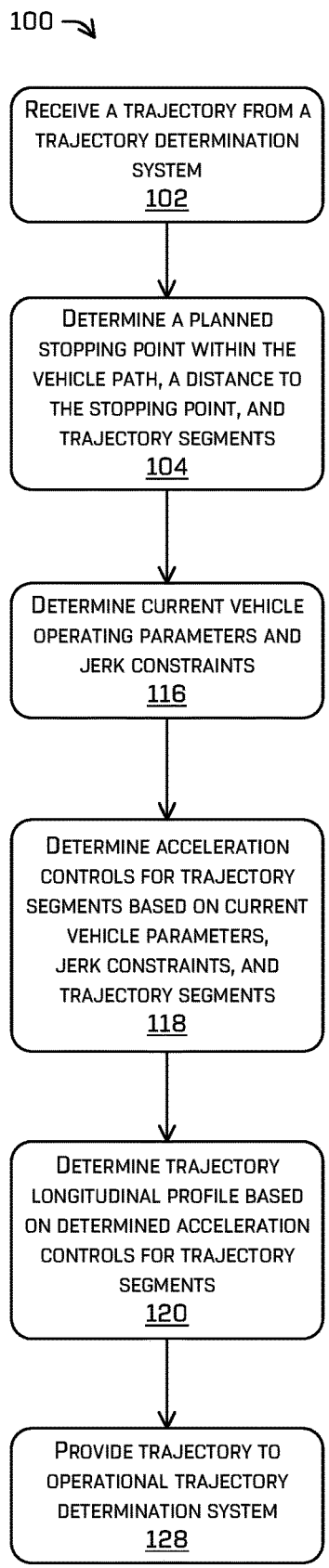
FIG. 1 illustrates an example process for determining and implementing spatially controlled acceleration in a vehicle, in accordance with examples of the disclosure.
Figure 1:
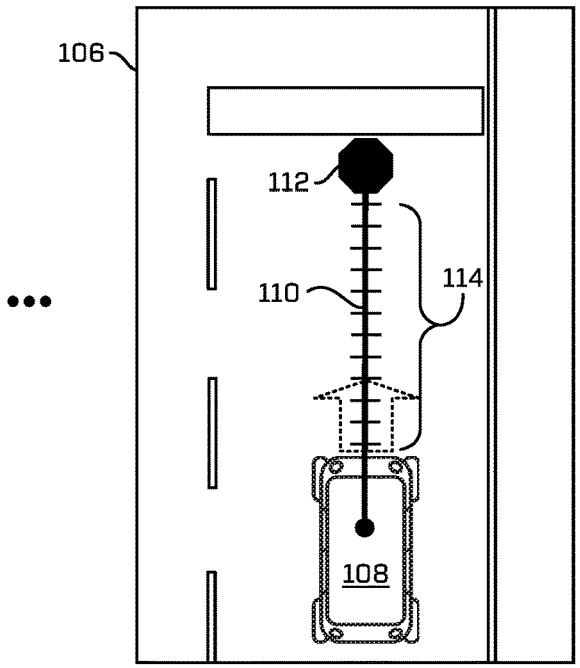
Figure 1:
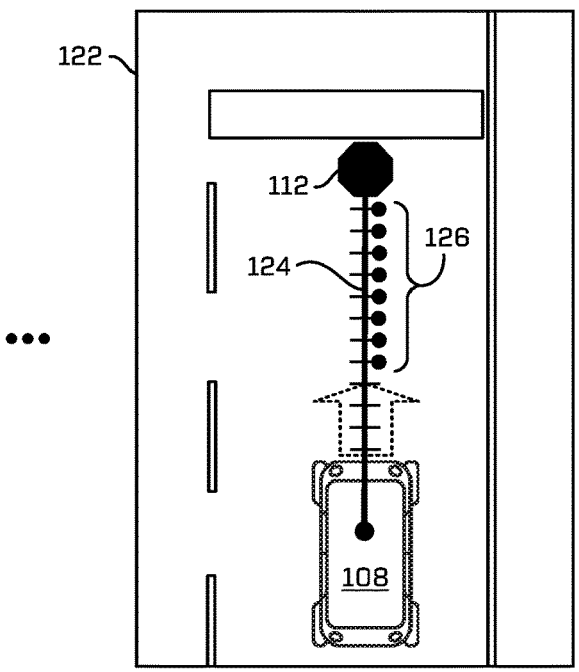

A vehicle may be capable of implementing various levels of acceleration and deceleration, for example, by applying various amounts of torque and/or braking pressure. The use of different levels of acceleration and deceleration, and the rates of change of acceleration and deceleration, may have associated impacts on vehicle performance and passenger comfort. The various techniques described herein may be used to determine appropriate acceleration and deceleration levels at particular spatial locations along a vehicle's region of travel based on bounded rates of change of acceleration and/or deceleration. These techniques may improve vehicle safety and passenger comfort. Systems and techniques for determining an acceleration level and/or a deceleration level to apply at a vehicle to implement controlled acceleration and deceleration based on various criteria are discussed herein.

In various examples, a vehicle computing system may execute an acceleration determination system that may determine or receive a trajectory for operating a vehicle in an environment, where the trajectory includes a region of travel for a vehicle, velocities for the vehicle along that region of travel, and, in some examples, a stopping point along the region of travel. In some examples, a stopping point may be represented in a trajectory as a (e.g., spatial) point where the vehicle velocity is zero. Such a trajectory, in various examples, may comprise one or more commands (e.g., steering angles, accelerations, etc.) and/or vehicle state components (e.g., position, velocity, orientation, etc.) associated with a plurality of spatial locations (which may be referred to as "waypoints"). This trajectory may be provided to the acceleration determination system by a trajectory determination system (e.g., that may, in some examples, also be executed by the vehicle computing system). In various examples, one or more trajectory determination systems associated with particular types of trajectories may provide trajectories to the acceleration determination system for the determination of acceleration and/or deceleration data. In some examples, these one or more trajectory determination systems may be configured with the acceleration determination system in a vehicle trajectory system.

In various examples, a determined trajectory of travel through an environment may be determined for a trajectory from among one or more candidate paths of travel and the resulting trajectory may be updated or modified with acceleration controls as described herein. For example, multiple paths of travel may be determined for a route between a vehicle (e.g., in a current or expected location) and a planned destination. A search (e.g., tree search) and/or one or more other techniques may be used to determine a determined trajectory for use in vehicle operation from among such multiple paths of travel. As a non-limiting example of such, the trajectory and/or any number of the multiple candidate trajectories may be used as an initial assumption in a more robust technique (including tree searches, non-linear optimization, or the like and/or any combinations thereof). Additionally or alternatively, based on detecting an obstacle in a planned path of travel, a vehicle computing system may determine multiple paths of travel for controlling the vehicle around such an obstacle and to a destination location. A search (e.g., tree search) and/or one or more other techniques may also be used to determine the path for use in vehicle operation from among these multiple paths of travel. Additional details of performing simulations and/or generating paths of travel for trajectories are described in U.S. patent application Ser. No. 15/632,147, filed on Jun. 23, 2017, now U.S. Pat. No. 10,133,275, issued Nov. 20, 2018, entitled "Trajectory Generation Using Temporal Logic and Tree Search," and U.S. patent application Ser. No. 16/889,238, filed on Jun. 1, 2020, entitled "Trajectory Generation Using Curvature Segments," which are incorporated herein by reference in their entirety and for all purposes.

The vehicle trajectory system may be configured to provide a trajectory to a tracking system and/or planning system for use in controlling the vehicle. A tracking system may, for example, determine a divergence from an expected or current vehicle state to a desired vehicle state (e.g., in accordance with the trajectory received) and generate one or more controls to attempt to correct the vehicle's motion to return to the desired trajectory. The vehicle trajectory system may determine, from the various trajectories and/or trajectory data that may be determined by associated trajectory determination systems and the acceleration determination system, a particular trajectory to provide to a tracking system and/or planning system. For example, a vehicle trajectory system may include an operational trajectory determination system that may receive one or more trajectories and/or trajectory data from one or more trajectory determination systems and/or one or more modified trajectories and/or modified trajectory data from an acceleration determination system. The operational trajectory determination system may determine, based on one or more received trajectories and/or trajectory data, a trajectory for use in controlling the vehicle. For example, the operational trajectory determination system may determine a distance to a planned stopping point (e.g., a point along a path of travel with a velocity of zero). The operational trajectory determination system may also, or instead, determine a distance to an unplanned stopping point that may be associated with a potential collision or intersection with an object (e.g., a point along a path of travel with a location that avoids an intersection with the object and has an associated velocity of zero). The operational trajectory determination system may determine, using data associated with generated trajectories, a trajectory that will stop the vehicle within a distance to a stopping point. In various examples, the various trajectory determination systems, acceleration determination systems, and operational trajectory determination systems described herein may be configured separately and to interoperate to determine one or more trajectories.

A trajectory may include a lateral profile representing directional parameters (e.g., steering controls or otherwise some control which is tangential to a direction of motion) and/or a longitudinal profile representing velocity parameters (e.g., velocity, acceleration, deceleration, and/or braking controls or otherwise some control along the direction of motion). In examples, a trajectory may include a planned, expected, or otherwise known stopping point (e.g., a point with a zero velocity), such as at a stop sign or a passenger drop-off area. In other examples, a trajectory may include an unexpected or otherwise unplanned stopping point (e.g., a point with a zero velocity), such as at or spatially just before an intersection with a potential obstacle. In some examples, a trajectory may include a distance to a desired stopping point (e.g., rather than a stopping point location), an indication of urgency (e.g., urgent, non-urgent), and/or an indication of one or more jerk constraints. Alternatively, a trajectory may not include a stopping point and may instead be associated with continuous vehicle travel (e.g., of non-zero velocity) through a region of travel.

In various examples, a detected event, such as the detection of an obstacle in the vehicle's region of travel in the environment or the detection of a vehicle malfunction, may introduce a need to stop a vehicle unexpectedly. In some cases, this unexpected stopping may be urgent, for example to avoid an imminent potential collision with an obstacle. In other cases, unexpected stopping may be non-urgent and associated with avoiding a non-imminent or less imminent potential intersection with an object. For example, a pedestrian or vehicle suddenly entering the path of travel of a vehicle relatively near the leading surface of the vehicle may introduce a need for urgent unplanned stopping. In another example, a pedestrian or vehicle entering the path of travel of a vehicle relatively distant from the leading surface of the vehicle may introduce a need for non-urgent unplanned stopping.

An acceleration determination system may determine one or more acceleration controls for the longitudinal profile of a planned trajectory that may include, for example, a planned stopping point or planned deceleration. Such an acceleration determination system may also, or instead, determine one or more acceleration controls for the longitudinal profile of an unplanned stopping point trajectory that may be used to address unplanned stopping situations, such as the avoidance of a potential collision situation or other situation where a vehicle may be controlled to stop based on an unplanned or unexpected event. Of course, the techniques described herein are not limited to longitudinal controls alone.

In various examples, the acceleration determination system may determine one or more acceleration controls for an operational trajectory (e.g. optimized trajectory) that has been determined by an operation trajectory determination system and may have been provided to the acceleration determination system for the determination of one or more acceleration controls. For example, a trajectory determined for use in operating a vehicle may be provided to the acceleration determination system, which may determine acceleration controls for the longitudinal profile of such a trajectory that may, for example, ensure that a vehicle comes to a stop at or before a stopping point (e.g., zero velocity point) indicated in the trajectory. This updated trajectory may then be used to control the vehicle.

In various examples, the acceleration determination system may determine one or more acceleration controls for a trajectory based on determining a divergence from an expected or current vehicle state to a desired vehicle state (e.g., in accordance with the trajectory received). For example, a vehicle computing system may determine that a vehicle is in an unexpected location based on a current operational trajectory and determine to generate an updated operational trajectory by updating one or more controls (e.g., update one or more acceleration controls using an acceleration determination system as described herein) to correct the vehicle's motion and return to a desired trajectory or path of travel.

To control a vehicle to a stop at or before reaching such planned or unplanned stopping points, an acceleration determination system may determine acceleration controls that may be implemented along the path of travel represented in an associated trajectory. Acceleration controls implemented at particular times (temporal implementation points) may be used to decelerate a vehicle (e.g., to a stop) but may require (e.g., relatively accurate) determinations of a vehicle location at the particular times to ensure that the vehicle is decelerating appropriately to stop at or before a stopping point. Determining current and predicted vehicle locations at particular times and also determining acceleration controls based on such predicted locations and times may be challenging as the vehicle traverses an environment because the vehicle and environmental characteristics may change over time, for example due to prior changes in the vehicle's acceleration, requiring repeated computationally intensive operations to maintain updated trajectories. In the disclosed systems and techniques, acceleration controls may be determined for spatial implementation points based on spatial segments of path of travel, one or more vehicle acceleration rate change constraints (e.g., jerk, jingle, etc. constraints), and various vehicle conditions without requiring the use of a temporal component. These systems and techniques may be used to more efficiently and accurately determine deceleration controls to safely bring a vehicle to a stop while maintaining passenger comfort by accelerating and/or decelerating the vehicle using minimal acceleration changes.

The acceleration determination system may determine deceleration and/or acceleration controls based on the spatial characteristics of a trajectory, the operational parameters of a vehicle, and/or one or more acceleration parameters. Such acceleration parameters may include one or more preferred or desired accelerations for one or more spatial implementation points (e.g., desired accelerations that may stop a vehicle at or before a stopping point location). The acceleration determination system may also, or instead, determine one or more segments and/or implementation points along the region of travel represented in a trajectory with which to associate deceleration and/or acceleration controls. An implementation point may be a spatial point associated with a spatial segment, or subset, of the region of travel represented in the trajectory at which an associated acceleration control may be implemented at the vehicle.

In various examples, an acceleration determination system may use a vehicle's velocity, one or more spatial segments or segment distances along a path of travel represented in a trajectory, one or more preferred or desired accelerations for one or more implementation points, and one or more jerk constraints or jerk bounds to determine an acceleration control for a particular segment along the path of travel. In examples (described in more detail herein), the acceleration determination system may determine two or more candidate acceleration controls for a particular spatial segment of the path of travel using one or more of these parameters. The acceleration determination system may compare the candidate acceleration controls to jerk constraint data to determine a candidate acceleration control that is within bounds of the jerk constraint data or otherwise proximate to (e.g., within a threshold value of) one or more jerk constraint values. For multiple candidate accelerations that may comply with the applicable jerk constraints, a candidate acceleration that is most proximate to a desired or preferred acceleration may be determined as an acceleration control. The acceleration determination system may then modify a trajectory (or determine a trajectory) to include the determined acceleration control at an associated implementation point associated with particular spatial segment.

In various examples, the acceleration determination system may use preconfigured and/or static jerk constraint data. In other examples, the acceleration determination system may determine jerk constraint data based on one or more criteria. For example, jerk constraint data may vary based on a type of stopping point indicated in a trajectory (e.g., planned, non-urgent unplanned, urgent planned, emergency, etc.). Alternatively or additionally, constraint data may vary based on a current, expected, or predicted velocity of a vehicle. Alternatively or additionally, constraint data may vary based on environmental conditions (e.g., weather, road surface, etc.) and/or vehicle conditions (e.g., vehicle capabilities, vehicle component wear, etc.). Other criteria may also, or instead, be used to determine or select an applicable jerk limit.

In various examples, the acceleration determination system may modify a received trajectory to include the spatially determined acceleration controls and/or associated spatial implementation points by modifying a longitudinal profile data in the received trajectory to include data representing such controls and/or implementation points. In at least some examples, lateral controls may be implemented in addition to, or alternative to, the longitudinal modifications. In various examples, the acceleration determination system may not modify other portions of the trajectory, for example, maintaining the lateral profile of the received trajectory. Alternatively or additionally, the acceleration determination system may determine or generate another trajectory based on the received trajectory that includes data representing spatially determined acceleration controls and/or spatial implementation points as well as the (e.g., same) lateral profile data and/or other data from the received trajectory. The acceleration determination system may provide the modified or newly determined trajectory and/or trajectory data with the spatially determined acceleration controls and/or associated spatial implementation points to another system operated by the vehicle computing system, such as an operational trajectory determination system. An operational trajectory determination system may determine, using one or more trajectories and/or associated trajectory and/or acceleration data received from the acceleration determination system, one or more trajectory determination systems, and/or one or more other systems, a particular trajectory for use in controlling the vehicle. In some examples, the acceleration determination system may instead, or also, provide or otherwise output data representing the determined acceleration controls and/or their implementation points and/or associated segments (e.g., rather than a complete trajectory), for example, to another system that may determine one or more trajectories based on such data.

In various examples, an acceleration determination system may determine acceleration data, longitudinal profile data, and/or modifications thereof for various types of trajectories. In various examples, the acceleration determination system may receive or determine a trajectory that includes operational controls and other data associated with a planned path of vehicle travel through an environment. The planned path may include a planned stopping point for which the acceleration determination system may determine acceleration controls for spatial segments along the path of travel represented in the planned trajectory that decelerate the vehicle to a stop at or proximate to (e.g., before reaching) the planned stopping point (also referred to as "deceleration controls").

The acceleration determination system may also or instead, determine acceleration controls for a trajectory that may be associated with an unplanned stopping point (e.g., determined based on a detection of a vehicle malfunction, a detection of an obstacle, a potential collision, a potential intersection with an object, an emergency condition, an intersection probability that a vehicle and an object will intersect (e.g., greater than a threshold probability), an intersection distance between a vehicle and an object (e.g., greater than a threshold distance), an intersection time associated with an potential collision (e.g., greater than a threshold amount of time), etc.). This unplanned stopping point may be associated with an urgent stopping point (e.g., imminent potential collision with an obstacle) or a non-urgent stopping point (e.g., relatively distant potential collision with an obstacle). The path represented in this unplanned stopping point trajectory may include an unplanned stopping point for which the acceleration determination system may determine acceleration controls for spatial segments along the path of travel represented in the unplanned stopping point trajectory that decelerate the vehicle to a stop at or proximate to (e.g., before reaching) the unplanned stopping point. This trajectory and/or associated data (e.g., unplanned stopping point, distance to unplanned stopping point or intersection with obstacle, etc.) may be received from a system configured to address unexpected or unplanned events, such as a collision avoidance system, obstacle detection system, etc.

The acceleration determination system may determine acceleration data for multiple trajectories substantially simultaneously and/or in parallel so that such trajectories may be available to a vehicle computing system (e.g., an operational trajectory determination system) for use in controlling a vehicle under various conditions. For example, the acceleration determination system may receive two or more trajectories having substantially similar lateral profiles and varying longitudinal profiles (e.g., different stopping points). The acceleration determination system may determine corresponding modified trajectories for the two or more trajectories, where the modified trajectories retain the substantially similar lateral profiles and are updated with varying acceleration controls based on the varying longitudinal profiles. These trajectories may be made available for consideration (e.g., by an operational trajectory determination system) as operational trajectories.

In various examples, the acceleration determination system may also, or instead, determine acceleration data for one or more trajectories as described herein repeatedly to substantially continuously determine such trajectories. The acceleration determination system may also, or instead, provide acceleration data for one or more trajectories and/or provide one or more modified trajectories updated with acceleration data to a vehicle computing system substantially continuously so that the vehicle computing system (e.g., always) has one or trajectories for use in controlling a vehicle. For example, acceleration data may be determined for trajectories as such trajectories are determined, for example, substantially continuously and/or incrementally at particular time periods (e.g., every 100 milliseconds, 0.5 seconds, etc.). Alternatively, or in addition, acceleration data may be determined for trajectories as such trajectories are determined based on changes in environmental, operational, and/or vehicle conditions (e.g., change in vehicle speed, change in vehicle acceleration, object detection, change in light conditions, change in weather conditions, selection of a different trajectory type, etc.). By using current and/or updated trajectories that include acceleration data determined as described herein, the disclosed systems and techniques may increase passenger comfort and operational safety of a vehicle traveling in an environment by accelerating and/or decelerating the vehicle using minimal acceleration change rates while retaining directional control of the vehicle.

In various examples, the acceleration determination system may determine acceleration data for a trajectory (e.g., acceleration controls for implementation at associated spatial segments along a path of travel) based on one or more acceleration parameters, vehicle parameters, and/or path parameters. Such parameters may be determined based on current or expected vehicle operational conditions or parameters, vehicle capabilities and/or condition, component capacities and/or condition, one or more vehicle and/or component configurations, and/or a received trajectory. For example, the acceleration determination system may use an expected vehicle position (expected position of the vehicle at a particular spatial point), an expected vehicle velocity (expected velocity of the vehicle at the particular spatial point), a type of acceleration associated with the trajectory (e.g., urgent, non-urgent, etc.), minimum permitted acceleration and/or maximum permitted deceleration, minimum and/or maximum rates of change of acceleration (e.g., acceleration rate change constraints or "jerk"), spatial segments of a path of travel, and/or spatial distances between implementation points associated with spatial segments to determine acceleration data for a trajectory. In various examples, the acceleration determination system may also, or instead, use a duration of time for control implementation (e.g., a period of between a control command issuance and a responsive reaction from a vehicle: may be referred to "reaction duration") determine acceleration data for a trajectory. In other examples, one or more reaction durations may be accounted for in other data and/or by other components (e.g., instead of an acceleration determination system or component). Any one or more other parameters that may be used by an acceleration determination system to determine acceleration controls, spatial segments and associated implementation points, and/or any other acceleration and/or longitudinal profile data are contemplated as within the scope of the instant disclosure.

Jerk constraints used by an acceleration determine system may include maximum and/or minimum acceleration rate change ("jerk") constraint parameters that may set a bound on the amount of change of acceleration represented by proximate acceleration controls. Jerk constraints may be preconfigured at a vehicle computing system and/or constant (e.g., as may be associated with varying levels of comfort) or may be dynamically determined based on various parameters (e.g., current, expected, predicted, and/or candidate acceleration and/or velocity: environmental conditions; vehicle conditions: number of passengers in vehicle: type of stopping point: etc.). In examples, an acceleration determination system may perform operations to determine acceleration controls such that the acceleration represented by consecutive acceleration controls may not vary by an amount of acceleration greater than the value of the maximum jerk parameter representing a maximum permitted change in acceleration (e.g., 0.5 meters per second cubed ($m/s^3$), 1 $m/s^3$, 1.5 $m/s^3$, etc.). A rapid change in acceleration or deceleration may affect the ability to reliably control a vehicle and may cause passenger discomfort due to rapid accelerating and/or rapid slowing. The use of the jerk constraints as described herein may help maintain reliable vehicle control and increase passenger comfort in acceleration situations. In various examples, a different maximum jerk may be defined (or otherwise determined) for various different scenarios, whether urgent, non-urgent, or otherwise.

In some examples, an acceleration determination system may maintain and/or receive acceleration parameter data associated with a vehicle (e.g., rather than, or in addition to, being associated with a particular trajectory), such as minimum and/or maximum acceleration capabilities and/or minimum and/or maximum stopping distances (e.g., based on velocity, braking system capabilities and/or conditions, motor capabilities and/or conditions, road surface, environmental and/or weather conditions, etc.). Other parameters associated with the vehicle and/or any other system, subsystem, or component other than a trajectory may also, or instead, be used by an acceleration determination system to determine acceleration controls, spatial segments and associated implementation points, and/or any other deceleration and/or longitudinal profile data.

The acceleration determination system may use such parameters to determine one or more acceleration controls for a received trajectory and/or to determine one or more spatial segments and implementation points at which one or more acceleration controls are to be implemented. For example, the acceleration determination system may determine acceleration controls that adjust the vehicle's acceleration (e.g., accelerate or decelerate) by particular amount of acceleration at particular spatial increments along the region of travel. The acceleration determination system may use the available acceleration parameters to determine the appropriate increments of acceleration change (e.g., implemented at acceleration controls) and spatial implementation points for implementing such changes. Detailed examples of such determinations are provided below.

In various examples, an acceleration determination system and/or a trajectory system may validate the acceleration controls determined as described herein and/or a trajectory that may include such acceleration controls. For example, for a trajectory that includes a stopping point (e.g., planned, unplanned, urgent, non-urgent, etc.) and one or more acceleration controls determined using the described techniques, the system may determine a velocity of the vehicle at the stopping point once the vehicle has been controlled to that point. If the velocity at or before that point is zero (e.g., the vehicle has stopped), the acceleration controls implemented to that point and/or the trajectory may be considered or indicated as valid. However, if the vehicle velocity at the stopping point is greater than, or substantially greater than, zero, the acceleration controls implemented to that point and/or the trajectory may not be considered or indicated as valid (e.g., not fully effective to stop the vehicle by the stopping point). Such validation data may be stored and/or used to analyze and improve acceleration determination and trajectory determination techniques, such as those described herein.

The systems and techniques described herein may be directed to leveraging trajectory data, vehicle operational data, acceleration parameters, and/or other data to enable a vehicle, such as an autonomous vehicle, to more accurately determine a vehicle trajectory that may include acceleration controls for improved vehicle control and operational safety, facilitating safer navigation through an environment and improved vehicle control during the implementation of changes in vehicle acceleration. In particular examples, the systems and techniques described herein can utilize data structures containing data representing a predicted region of travel, expected (e.g., expected current position) and/or predicted positions of a vehicle and/or objects in an environment, environmental and/or vehicle conditions, lateral and/or longitudinal profiles, and/or any other trajectory data and/or associated data. By using the acceleration determination techniques described herein to more accurately determine acceleration data for a trajectory that may be used as an operational trajectory, the examples described herein may result in increased safety and accuracy of vehicle control, especially vehicle stopping operations, thereby allowing an autonomous vehicle to more safely operate in an environment. For example, the techniques described herein may be faster and/or more robust than conventional techniques, as they may increase the ability of an autonomous vehicle to safely navigate in an environment and more smoothly implement acceleration operations to reach a stopping point (which may, in turn, provide more comfortable rider experiences while ensuring safe operation of the vehicle). That is, techniques described herein provide a technological improvement over existing vehicle trajectory and acceleration determination technology.

The techniques described herein may also improve the operation of computing systems and increase resource utilization efficiency. For example, computing systems, such as vehicle computing systems, may more efficiently perform trajectory and acceleration determinations using the techniques described herein because the disclosed examples may reduce the amount of data needed to determine acceleration controls by reducing or eliminating the use of temporal data in determining such controls. The disclosed examples may also reduce the amount of data needed to represent various types of trajectories (e.g., by using the same lateral trajectory profile for multiple trajectories) and reduce the amount of processing required to determine acceleration controls for multiple trajectories by off-loading acceleration determinations to an acceleration determination system from one or more trajectory determination systems. Furthermore, computing systems, such as vehicle computing systems, may more efficiently perform trajectory and acceleration determination operations and the calculations required to determine an operational trajectory by maintaining updated acceleration data and associated trajectories for a variety of situations, thereby requiring less processing to determine an operational trajectory under particular conditions than would be required using conventional techniques where a trajectory and its associated acceleration controls are generated in response to various conditions.

The systems and techniques described herein can be implemented in a number of ways. Example implementations are provided below with reference to the following figures. Although the disclosed techniques may be discussed in the context of an autonomous vehicle, the techniques described herein can be applied to a variety of systems (e.g., a semi-autonomous vehicle, a manually operated vehicle, a sensor system, a robotic platform, etc.) and are not limited to autonomous vehicles. In another example, the techniques can be utilized in an aviation or nautical context, or in any system involving vehicle or object trajectories and/or deceleration control and/or implementation point determination operations. Further, although aspects of the disclosed systems and techniques may be discussed in the context of originating with particular types of sensor data and processing with particular types of components, data and data structures as described herein can include any two-dimensional, three-dimensional, or multi-dimensional data and data associated with any types of sensors (e.g., cameras, lidar, radar, sonar, time-of-flight, and the like). Additionally, the systems and techniques described herein can be used with real data (e.g., captured using sensor(s)), simulated data (e.g., generated by a simulator, training data, and the like) or any combination of thereof.

FIG. 1 is a pictorial flow diagram of an example process 100 for determining acceleration data for a vehicle trajectory and providing a trajectory for use in controlling a vehicle. In examples, one or more operations of the process 100 may be implemented by a vehicle computing system, such as by using one or more of the components and systems illustrated in FIGS. 4-7 and described below. For example, one or more components and systems can include those associated with vehicle trajectory system 400 illustrated in FIG. 4: trajectory determination system 516, acceleration determination system 518, and/or operational trajectory determination system 520 illustrated in FIG. 5: trajectory determination system 616, acceleration determination system 618, and/or operational trajectory determination system 620 illustrated in FIG. 6; and/or processors 716 and/or 744, memories 718 and/or 746, trajectory determination system(s) 732, acceleration determination system 734, and/or operational trajectory determination system 736 illustrated in FIG. 7. In examples, the one or more operations of the process 100 may be performed by a remote system in communication with a vehicle, such as trajectory determination system 752, acceleration determination system 754, and/or operational trajectory determination system 756 illustrated in FIG. 7. In still other examples, the one or more operations of the process 100 may be performed by a combination of a remote system and a vehicle computing system. However, the process 100 is not limited to being performed by such components and systems, and the components and systems of FIGS. 4-7 are not limited to performing the process 100.

At operation 102, an acceleration determination system, for example executing at or in communication with a vehicle computing system, may determine or otherwise receive a vehicle trajectory for use in controlling a vehicle traveling in an environment. This trajectory may include data indicating an intended and/or predicted region of travel for the vehicle in the environment, a position (e.g., an expected or current position) of the vehicle in the environment, and one or more vehicle controls, such as steering controls, acceleration controls, braking controls, and/or other vehicle control information that may be used by the vehicle computing system to control the vehicle. Trajectory data may include lateral profile data representing directional parameters (e.g., steering controls) and/or longitudinal profile data representing velocity parameters (e.g., acceleration, deceleration, and/or braking controls). In various examples, a trajectory may also include vehicle, operational, and/or environmental condition data (e.g., expected or current vehicle velocity, acceleration, deceleration, etc.) and/or detection data (e.g., associated with one or more objects and/or features detected within the environment). The trajectory received at operation 102 may be based on a planned route or path of travel and may not include deceleration controls for controlling a vehicle in response to detections of unexpected obstacles or unplanned conditions.

At operation 104, the acceleration determination system may determine that the received trajectory includes a planned stopping point. The acceleration determination system may determine a spatial distance from an expected vehicle position to the planned stopping point and/or may determine one or more spatial segments along the path of travel from the expected vehicle position to the stopping point. In some examples, such segments may be a fixed spatial lengths (e.g., 0.5 m, 1 m, 2 m, etc.), while in other examples, such segments may be variable and may be dynamically determined, for example, based on an expected vehicle velocity and/or acceleration (e.g., segment length may increase with vehicle velocity and vice versa), vehicle position on a path of travel, path of travel, type of path of travel (e.g., longer segments for road surfaces where vehicle response may be slower, etc.), etc. . . .

An example 106 illustrates a top-down view of an environment in which a vehicle 108 may be traveling. The vehicle 108 may be traveling in the direction indicated by the dashed arrow. A trajectory determination system executed at the vehicle 108 (e.g., by a vehicle computing system configured at the vehicle 108) may determine a trajectory 110 (lateral and longitudinal profile represented as 110 in this example) that may be provided to an acceleration determination system that may also be executed at the vehicle 108 (e.g., by a vehicle computing system configured at the vehicle 108). The trajectory 110 that may be an initial trajectory for controlling the vehicle 108 under normal conditions. For example, the initial trajectory 110 may be based on a planned route or path of travel. The trajectory 110 may include a planned stopping point 112. In some examples, the vehicle 108 may be at an expected location along the path of travel represented in the trajectory 110, while in other examples, the vehicle may be off such a path (e.g. in an unexpected location).

The trajectory 110 may be segmented into one or more longitudinal spatial segments 114 representing subsets of longitudinal path of travel represented by the trajectory 110. Individual segments of segments 114 may be arc lengths of any length and/or curvature (e.g., may be curved or straight). In various examples, individual segments of segments 114 be substantially similar or equal lengths, while in other examples, such lengths may vary (e.g., increased spacing with distance). In some examples, the segments may be received or otherwise indicated in the trajectory received at the acceleration determination system (e.g., in the longitudinal data of the trajectory). In other examples, the acceleration determination system may determine the segments 114 based on the path of travel represented by the received trajectory. For example, the acceleration determination may determine segments of a predetermined length along the path of travel between the vehicle 108 and the stopping point 112. The trajectory 110 may or may not include acceleration controls.

The trajectory 110 may include any one or more of the parameters (e.g., acceleration parameters, vehicle parameters, etc.) that the acceleration determination system may use to determine acceleration data for one or more trajectories determined based on the trajectory 110. In various examples, the acceleration determination system may determine any one or more of such parameters from one or more alternate sources, such as one or more other vehicle components and/or from data stored at or otherwise accessible to the acceleration determination system.

At operation 116, the acceleration determination system may determine one or more parameters that it may use to determine the acceleration data for the trajectory received at operation 102. For example, the acceleration determination system may determine an expected (e.g., expected current) vehicle position, an expected (e.g., expected current) vehicle velocity, applicable jerk constraint data (minimum/maximum jerk rate), etc. The acceleration determination system may instead, or also, determine one or more other parameters that may be used to determine acceleration controls, such as vehicle capability and/or condition data, environmental condition data, weather condition data, acceleration determination system configurations, etc.

At operation 118, the acceleration determination system may determine one or more acceleration controls and/or associated spatial implementation points for spatial segments along the path of travel represented in the longitudinal profile of the received trajectory. For example, the acceleration determination system may determine, for individual spatial segments, candidate acceleration controls to apply at individual implementation points associated with such spatial segments. The acceleration determination system may then use jerk constraint data to determine a particular acceleration control from among the candidate acceleration controls for a particular segment. In examples, the controls determined at operation 118 may be determined for controlling of the vehicle back onto an expected or planned path of travel where a current vehicle location is off of such a path of travel. In some examples, the acceleration determination system may perform operations such as those described in more detail regarding FIG. 3 to determine an acceleration control for a spatial segment.

At operation 120, the acceleration determination system may modify the received initial trajectory's longitudinal profile to include the determined one or more acceleration controls and/or spatial implementation points. The acceleration determination system may not make modifications to other portions of the trajectory, such as the lateral profile. Alternatively or additionally, the acceleration determination system may, at operation 120, generate or otherwise determine a new trajectory based on the received initial trajectory by determining the new trajectory's longitudinal profile based on the determined one or more deceleration controls and/or implementation points and using the remaining portions of the received trajectory (e.g., lateral profile) for the remaining portions of the new trajectory.

An example 122 illustrates a top-down view of the environment of the example 106 in which the vehicle 108 may be traveling. The acceleration determination system may modify the initial trajectory 110 of the example 106 to determine the updated trajectory 124. Alternatively or additionally, the acceleration determination system may determine the trajectory 124 based on the initial trajectory 110 of the example 106. The trajectory 124 may retain the stopping point 112 and the same path of travel and lateral profile of the initial trajectory 110.

In this example, the acceleration determination system may modify the longitudinal profile data of the trajectory 110 to determine the updated trajectory 124 to include the acceleration controls 126 at the spatial implementation points indicated by the dots along the trajectory 124. These spatial implementation points may be located at the boundaries of spatial segments of the path of travel represented by the trajectory and/or elsewhere within the spatial segments of the path of travel. As described herein, the acceleration controls 126 and/or the associated spatial implementation points may be determined based on one or more acceleration parameters and/or other data. The acceleration determination system may configure the acceleration controls 126 to, when implemented at the vehicle, cause the vehicle 108 to stop at or before the stopping point 112 using rates of change of acceleration that are within the bounds of the applicable jerk constraints.

At operation 128, the acceleration determination system may provide the modified and/or determined trajectory, including one or more determined acceleration controls and/or spatial implementation points, to an operational trajectory determination system. This operational trajectory determination system may determine, using one or more available trajectories (that may include the modified trajectory) and/or associated trajectory data, a particular trajectory to provide to a tracking and/or planning system and/or to otherwise use to control a vehicle. For example, the trajectory and/or data associated therewith, as modified or determined at operation 120, may be included among one or more trajectories generated or otherwise provided to the operational trajectory determination system and upon which the trajectory selection system may determine an operational trajectory to provide to a tracking system and/or planning system.

In various examples, the operations of the process 100 may be performed within an individual vehicle trajectory system that determines a trajectory (e.g., from among one or more generated or determined trajectories) to provide to a tracking system and/or planning system. Alternatively or additionally, the operations of the process 100 may be performed by multiple individual trajectory-related systems that determine and/or provide trajectories for determination as a selected trajectory for vehicle control and/or to provide to a tracking system and/or planning system.

Figure 2:
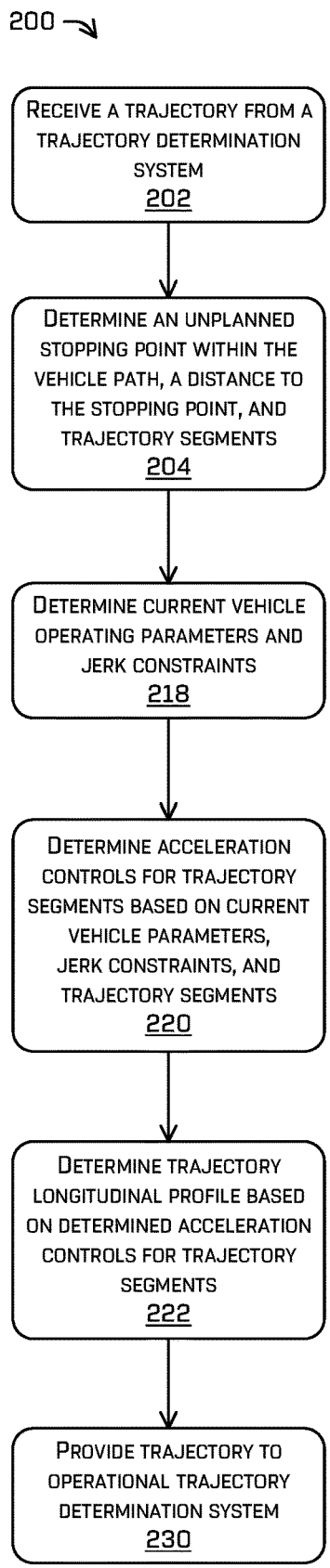
FIG. 2 illustrates another example process for determining and implementing spatially controlled acceleration in a vehicle, in accordance with examples of the disclosure.
Figure 2:
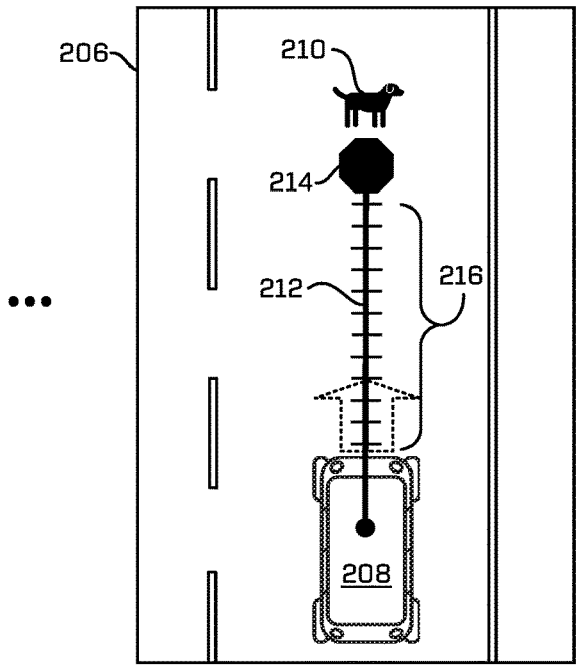
Figure 2:
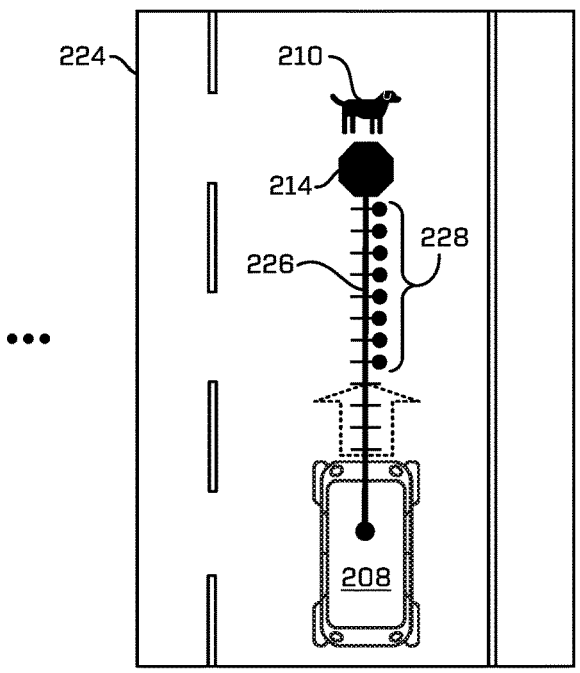

FIG. 2 is a pictorial flow diagram of an example process 200 for determining acceleration data for a vehicle trajectory and providing a trajectory for use in controlling a vehicle. In examples, one or more operations of the process 200 may be implemented by a vehicle computing system, such as by using one or more of the components and systems illustrated in FIGS. 4-7 and described below. For example, one or more components and systems can include those associated with vehicle trajectory system 400 illustrated in FIG. 4; trajectory determination system 516, acceleration determination system 518, and/or operational trajectory determination system 520 illustrated in FIG. 5: trajectory determination system 616, acceleration determination system 618, and/or operational trajectory determination system 620 illustrated in FIG. 6; and/or processors 716 and/or 744, memories 718 and/or 746, trajectory determination system(s) 732, acceleration determination system 734, and/or operational trajectory determination system 736 illustrated in FIG. 7. In examples, the one or more operations of the process 200 may be performed by a remote system in communication with a vehicle, such as trajectory determination system 752, acceleration determination system 754, and/or operational trajectory determination system 756 illustrated in FIG. 7. In still other examples, the one or more operations of the process 200 may be performed by a combination of a remote system and a vehicle computing system. However, the process 200 is not limited to being performed by such components and systems, and the components and systems of FIGS. 4-7 are not limited to performing the process 200.

At operation 202, an acceleration determination system, for example executing at or in communication with a vehicle computing system, may determine or otherwise receive a vehicle trajectory for use in controlling a vehicle traveling in an environment. This trajectory and/or associated data (e.g., unplanned stopping point, distance to unplanned stopping point or intersection with obstacle, etc.) may be received from a system configured to address unexpected or unplanned events, such as a collision avoidance system, obstacle detection system, etc. In various examples, this trajectory and/or associated data may include a distance to a desired stopping point and one or more of an indication of urgency (e.g., urgent, non-urgent) and an indication of one or more jerk constraints. This trajectory may include data indicating an intended and/or predicted region of travel for the vehicle in the environment, a position (e.g., an expected position) of the vehicle in the environment, and one or more vehicle controls, such as steering controls, acceleration controls, braking controls, and/or other vehicle control information that may be used by the vehicle computing system to control the vehicle. Trajectory data may include lateral profile data representing directional parameters (e.g., steering controls) and/or longitudinal profile data representing velocity parameters (e.g., acceleration, deceleration, and/or braking controls). In various examples, a trajectory may also include vehicle, operational, and/or environmental condition data (e.g., expected vehicle velocity, acceleration, deceleration, etc.) and/or detection data (e.g., associated with one or more objects and/or features detected within the environment). The trajectory received at operation 202 may be based on one or more detections, such as a detection of an obstacle or other unexpected event, and may therefore include an unplanned stopping point. For example, the trajectory received at operation 202 may be based on a detected vehicle malfunction, a detected imminent or relatively distant potential collision with an obstacle, etc. The unplanned stopping point represented in the trajectory may be a spatial point at which the vehicle may be stopped to avoid a hazardous condition or to minimize damage or other adverse effects.

At operation 204, the acceleration determination system may determine that the received trajectory includes an unplanned stopping point. The acceleration determination system may determine a spatial distance from an expected vehicle position to the unplanned stopping point and/or may determine one or more spatial segments along the path of travel from the expected vehicle position to the stopping point. Such segments may be a fixed spatial lengths, variable, and/or dynamically determined as described herein.

An example 206 illustrates a top-down view of an environment in which a vehicle 208 may be traveling. An object 210 (e.g., a dog) may also be present in the environment and may be located on a drivable roadway, presenting an unexpected obstacle to the vehicle 208. The vehicle 208 may be traveling in the direction indicated by the dashed arrow towards the object 210. A trajectory determination system executed at the vehicle 208 (e.g., by a vehicle computing system configured at the vehicle 208) may determine a trajectory 212 (lateral and longitudinal profile represented as 212 in this example) that may be provided to an acceleration determination system that may also be executed at the vehicle 208 (e.g., by a vehicle computing system configured at the vehicle 208). The trajectory 212 that may be an initial trajectory for controlling the vehicle 208 under unexpected conditions. For example, the initial trajectory 212 may be based on the detection of the object 210 and may include data representing and/or associated with that detection. The trajectory 212 may include an unplanned stopping point 214 that may be determined based on the detection of the unexpected object 210.

The trajectory 212 may be segmented into one or more longitudinal spatial segments 216 representing subsets of longitudinal path of travel represented by the trajectory 212. Individual segments of segments 216 may be arc lengths of any length and/or curvature. In various examples, individual segments of segments 216 be (e.g., substantially) equal lengths or of variable lengths. As noted herein, individual segments may be received or otherwise indicated in a trajectory received at the acceleration determination system or the acceleration determination system may determine such segments (e.g., of predetermined lengths). The trajectory 212 may or may not include acceleration controls.

The trajectory 212 may include any one or more of the parameters that may be used by the acceleration determination system to determine acceleration data for any trajectories determined based on the trajectory 212. Such parameters may also, or instead, be determined from one or more alternate sources.

At operation 218, the acceleration determination system may determine one or more parameters that it may use to determine the acceleration data for the trajectory received at operation 202. For example, the acceleration determination system may determine an expected vehicle position, an expected vehicle velocity, applicable jerk constraint data, reaction duration data, etc. The acceleration determination system may instead, or also, determine one or more other parameters that may be used to determine acceleration controls, such as vehicle capability and/or condition data, environmental condition data, weather condition data, acceleration determination system configurations, etc.

At operation 220, the acceleration determination system may determine one or more acceleration controls and/or associated spatial implementation points for spatial segments along the path of travel represented in the longitudinal profile of the received trajectory. For example, the acceleration determination system may determine, for individual spatial segments, candidate acceleration controls to apply at individual implementation points associated with such spatial segments. The acceleration determination system may then use jerk constraint data to determine a particular acceleration control from among the candidate acceleration controls for a particular segment. In some examples, the acceleration determination system may perform operations such as those described in more detail regarding FIG. 3 to determine an acceleration control for a spatial segment.

At operation 222, the acceleration determination system may modify the received initial trajectory's longitudinal profile to include the determined one or more acceleration controls and/or spatial implementation points. The acceleration determination system may or may not make modifications to other portions of the trajectory, such as the lateral profile. Alternatively or additionally, the acceleration determination system may, at operation 222, generate or otherwise determine a new trajectory based on the received initial trajectory by determining the new trajectory's longitudinal profile based on the determined one or more deceleration controls and/or implementation points and using the remaining portions of the received trajectory (e.g., lateral profile) for the remaining portions of the new trajectory.

An example 224 illustrates a top-down view of the environment of the example 206 in which the vehicle 208 may be traveling. The acceleration determination system may modify the initial trajectory 212 of the example 206 to determine the updated trajectory 226. Alternatively or additionally, the acceleration determination system may determine the trajectory 226 based on the initial trajectory 212 of the example 206. The trajectory 226 may retain the stopping point 214 based on the detection of the object 210 and may retain the same path of travel and lateral profile of the initial trajectory 212.

In this example, the acceleration determination system may modify the longitudinal profile data of the trajectory 212 to determine the updated trajectory 226 to include the acceleration controls 228 at the spatial implementation points indicated by the dots along the trajectory 226. As with other trajectories described herein, these spatial implementation points may be located at the boundaries of spatial segments of the path of travel represented by the trajectory and/or elsewhere within the spatial segments of the path of travel. The acceleration controls 228 and/or the associated spatial implementation points may be determined based on one or more acceleration parameters and/or other data, for example, as described in more detail herein. The acceleration determination system may configure the acceleration controls 228 to, when implemented at the vehicle, cause the vehicle 208 to stop at or before the stopping point 214 (thereby avoiding collision with object 210) using rates of change of acceleration that are within the bounds of the applicable jerk constraints.

At operation 230, the acceleration determination system may provide the modified and/or determined trajectory, including one or more determined acceleration controls and/or spatial implementation points, to an operational trajectory determination system. This operational trajectory determination system may determine, using one or more available trajectories (that may include the modified trajectory) and/or trajectory data, a particular trajectory to provide to a tracking and/or planning system and/or to otherwise use to control a vehicle. For example, the trajectory, as modified or determined at operation 222, may be included among one or more trajectories generated or otherwise provided to the operational trajectory determination system and that the operational trajectory determination system may use to determine a trajectory to provide to a tracking system and/or planning system.

In various examples, the operations of the process 200 may be performed within an individual vehicle trajectory system that determines a trajectory (e.g., from among one or more generated or determined trajectories) to provide to a tracking system and/or planning system. Alternatively or additionally, the operations of the process 200 may be performed by multiple individual trajectory-related systems that determine and/or provide trajectories for determination as a selected trajectory for vehicle control and/or to provide to a tracking system and/or planning system.

Figure 3:
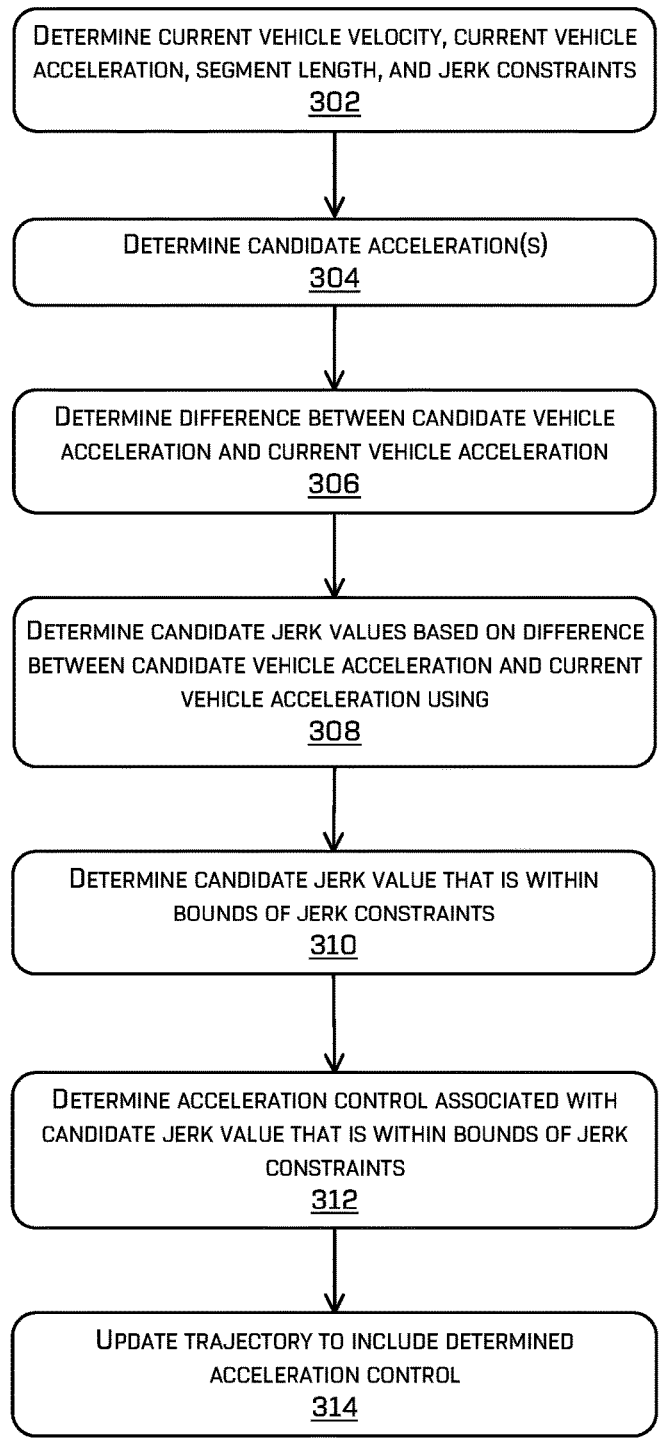
FIG. 3 illustrates an example process for determining an acceleration control for a vehicle, in accordance with examples of the disclosure.
Figure 3:
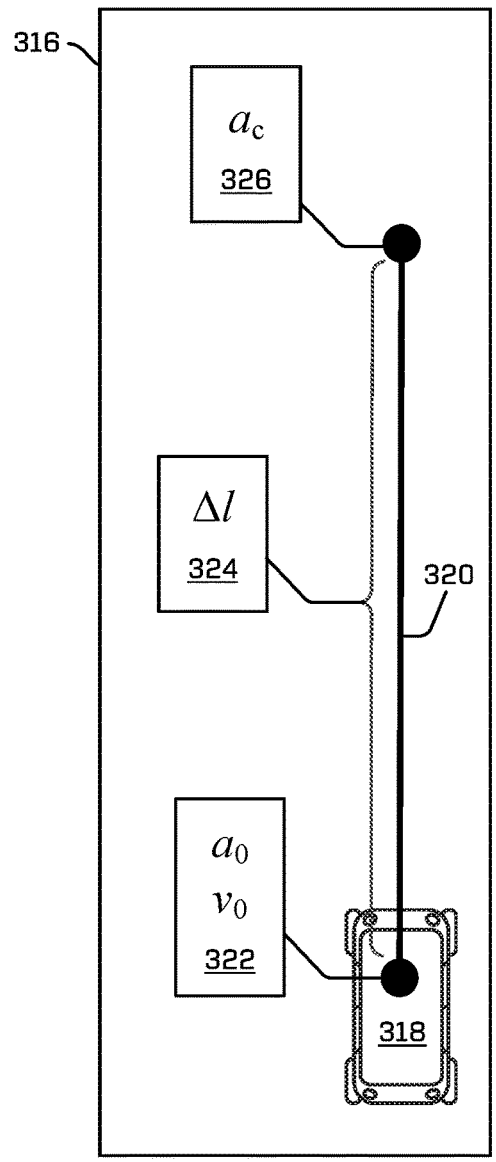

FIG. 3 is a pictorial flow diagram of an example process 300 for determining an acceleration control for a subsequent segment of a path of travel represented in a vehicle trajectory based on an expected vehicle acceleration, velocity, and other parameters. In examples, one or more operations of the process 300 may be implemented by a vehicle computing system, such as by using one or more of the components and systems illustrated in FIGS. 4-7 and described below. For example, one or more components and systems can include those associated with vehicle trajectory system 400 illustrated in FIG. 4: trajectory determination system 516, acceleration determination system 518, and/or operational trajectory determination system 520 illustrated in FIG. 5; trajectory determination system 616, acceleration determination system 618, and/or operational trajectory determination system 620 illustrated in FIG. 6; and/or processors 716 and/or 744, memories 718 and/or 746, trajectory determination system(s) 732, acceleration determination system 734, and/or operational trajectory determination system 736 illustrated in FIG. 7. In examples, the one or more operations of the process 300 may be performed by a remote system in communication with a vehicle, such as trajectory determination system 752, acceleration determination system 754, and/or operational trajectory determination system 756 illustrated in FIG. 7. In still other examples, the one or more operations of the process 300 may be performed by a combination of a remote system and a vehicle computing system. However, the process 300 is not limited to being performed by such components and systems, and the components and systems of FIGS. 4-7 are not limited to performing the process 300.

The process 300 may be performed for particular segments on a path of travel represented in a trajectory. In various examples, spatial implementation points may be at the terminal ends of such spatial segments. An acceleration determination system may determine an acceleration control for a second spatial implementation point at a second end of a spatial segment based on current or expected vehicle parameters (e.g., velocity, acceleration, etc.) associated with a first spatial implementation point at a first end of the spatial segment, where the vehicle may be currently traversing or expected to traverse the first spatial implementation point and entering the spatial segment traveling towards the second spatial implementation point. Parameters associated with the first implementation point may be referred to as "expected" parameters and/or "current" parameters, referring to expected vehicle parameters, that is, parameters having values as they are expected to be when the vehicle occupies that point in space (e.g., expected current acceleration when vehicle is at that point, expected current velocity when vehicle is at that point, etc.).

At operation 302, an acceleration determination system, for example executing at or in communication with a vehicle computing system, may determine various parameters for a vehicle currently traversing an environment and associated with a particular segment of a path of travel represented in in a trajectory. In various examples, the acceleration determination system may determine an expected current velocity of the vehicle ($v_0$) at the particular segment, an expected current acceleration of the vehicle ($a_0$) at the particular segment, a segment length ($\Delta l$) (e.g., arc length) of the segment, and one or more jerk constraints (e.g., jerk rate lower bound ($j_{lb}$) and/or jerk rate upper bound ($j_{ub}$)). Note that a velocity of the vehicle ($v_0$) at a particular segment and an acceleration of the vehicle (do) at that segment may be predicted values used to determine controls for spatial implementation points subsequent to the most spatially proximate implementation point to a vehicle's current location.

The expected and/or current velocity and acceleration for a particular segment and may be determined based on data received or obtained by the vehicle computing system, for example, determined using data received from one or more components configured at or associated with the vehicle. In further segments, such a velocity may be computed based on a previously determined acceleration and spacing between segments. The segment length may be a preconfigured length (e.g., 0.5 m, 1 m, 2 m, etc.) of a path through an environment associated with a trajectory. This segment length may be determined from the trajectory and/or preconfigured at the acceleration determination system. Alternatively, the segment length may be variable and/or dynamically determined. Such variable segment lengths may be determined at the acceleration determination system and/or based on the trajectory, the expected/current vehicle velocity, and/or the expected/current vehicle acceleration. The jerk constraint values may also, or instead, be determined from the trajectory and/or preconfigured at the acceleration determination system or otherwise determined and/or configured at the vehicle computing system, for example, based on one or more criteria as described herein.

At operation 304, the acceleration determination system may determine one or more candidate accelerations ($a_c$). For example, the acceleration determination system may determine a number of segments between the vehicle and a stopping point represented in a trajectory and determine one or more candidate acceleration controls that may accomplish a goal of a slowing of the vehicle such that it is stopped at or before the stopping point. At operation 304, the acceleration determination system may determine the one or more candidate accelerations for a particular segment based on the expected or current velocity and acceleration in use when the vehicle reaches or is predicted to reach that particular segment and the acceleration goal.

As will be appreciated, jerk values are typically determined as a function of time. However, by using the techniques set forth herein, jerk values and acceleration changes that comply therewith may be determined without the use of temporal data, facilitating a more accurate and efficient acceleration change determinations. For example, a jerk value ($j_c$) may be defined using the series of equations (1) shown below:

$$j_c = \frac{a_c - a_0}{\Delta t} \qquad (1)$$

where $\Delta t$ is a difference between a current (e.g., expected) time and a next time. However, the current time may not be known because it may change based on the acceleration ($a_c$), and therefore $\Delta t$ may not be known. Thus, a segment length ($\Delta l$) may be used to eliminate the temporal dependency of a jerk value ($j_c$):

$$j_c = \frac{a_c - a_0}{\Delta \ell} \frac{\Delta \ell}{\Delta t} \qquad (2)$$

where segment length ($\Delta l$) may be defined as:

$$\Delta \ell = \frac{v_1 + v_0}{2} \Delta t \qquad (3)$$

using a current velocity ($v_0$) and a velocity ($v_1$) at a next step, which provides for the representation of jerk as equation (4).

$$j_c = \frac{a_c - a_0}{\Delta \ell} \frac{v_1 + v_0}{2} \tag{4}$$

Using the law of work and energy question (5):

$$v_1^2 = v_0^2 + 2a_c \Delta \ell \tag{5}$$

the jerk value ($j_c$) may be represented using equation (6) below, which does not require any temporal values.

$$j_c = \frac{(a_c - a_0)\left(\sqrt{v_0^2 + 2a_c \Delta \ell} + v_0\right)}{2\Delta \ell} \tag{6}$$

At operation 306, the acceleration determination system may determine a difference ($\Delta a$) between the one or more candidate accelerations and the expected or current acceleration using spatial values and without using temporal values. In examples, the acceleration determination system may define this difference as shown below in equation (7).

$$\Delta a = a_c - a_0 \tag{7}$$

At operation 308, the acceleration determination system may determine one or more candidate jerk values ($j_c$) based on the one or more candidate accelerations ($a_c$), the current velocity ($v_0$), the current acceleration ($a_0$), and the segment length ($\Delta l$). In examples, the acceleration determination system may determine one or more candidate jerk values ($j_c$) based on one or more candidate accelerations by solving the equation shown below in equation (8) for the one or more candidate accelerations.

$$\Delta a^3 + a_0 \Delta a^2 + 2v_0 j_c \Delta a - 2j_c^2 \Delta l = 0 \tag{8}$$

In various examples, because the acceleration determination system may manipulate either or both of the candidate jerk values ($j_c$) and the one or more candidate accelerations ($a_c$), for example in evaluating equation (8), the acceleration determination system may determine one or more candidate accelerations that correspond to particular jerk values or vice versa. For example, the acceleration determination system may determine one or more candidate jerk values based on one or more particular candidate accelerations (e.g., using equation (8)) and/or one or more candidate accelerations based on one or more particular candidate jerk values (e.g., using equation (6)). The acceleration determination system may then determine which of the candidate acceleration values comply to the jerk values associated with jerk constraints (e.g., within boundaries of a range of jerk values associated with jerk constraints).

In various examples, the system may determine candidate accelerations based on a distance to a stopping point. For example, the system may determine, and evaluate the resulting jerk values, for candidate acceleration values that may sufficiently decelerate the vehicle such that it comes to a stop at or before a stopping point. The system may take into account a number of implementation points along the path from a current or expected vehicle location and the location of the stopping point in determining these candidate accelerations. Once determined, the system may iteratively evaluate the jerk values resulting from the candidate acceleration values to determine the acceleration values that stop the vehicle within an adequate distance and comply with the applicable jerk constraints.

If multiple candidate acceleration values are available to comply with the applicable jerk constraints, the system may select acceleration values for particular implementation points based on various criteria, such as increasing passenger comfort, increasing efficient usage of vehicle resources, increased safety, etc.

At operation 310, the acceleration determination system may determine one or more of the determined jerk values ($j_c$) that may be within the bounds of the applicable jerk constraints (e.g., $j_{lb} \leq j_c \leq j_{ub}$) and/or whether the resultant jerk is within the limits. At operation 312, the acceleration determination system may determine the candidate acceleration ($a_c$) associated with the jerk value that is within the bounds of the jerk constraints. At operation 314, the acceleration determination system may incorporate this determined candidate acceleration ($a_c$) into a trajectory as an acceleration control to be implemented at the spatial segment following the current spatial segment associated with the current velocity ($v_0$) and the current acceleration ($a_0$).

The process 300 may be iteratively performed to determined acceleration controls for spatially subsequent implementation points along a path of travel associated with a trajectory. For example, the system may determine an acceleration control for a first, most spatially proximate implementation point to a current vehicle location (e.g., separated from the vehicle by a segment length) and then use that determining acceleration control to determine a predicted current vehicle velocity, a predicted current vehicle acceleration, etc., for that first spatial implementation point that the system may then use to determine a second acceleration control for a second, next most spatially proximate (e.g., spatially subsequent) implementation point (e.g., that may be separated from the first spatial implementation point by a segment length), and so forth. In this way, the system may determine the acceleration controls for the individual implementation points between a current vehicle location and a stopping point.

An example 316 illustrates a segment, a vehicle at a current position, and example parameters that may be used as described above in regard to process 300 to determine an acceleration control. The vehicle 318 may be at a current spatial position as a first end of a segment 320. The first end of the segment may be associated with a spatial implementation point 322. At its current location, the vehicle 318 may have a current acceleration (do) and a current velocity ($v_0$). The length of the segment may be segment length ($\Delta l$) 324. A second spatial implementation point 326 may be at the second end of the segment 320. An acceleration control for implementing an acceleration ($a_c$) at the vehicle at the second spatial implementation point 326 may be determined by executing the process 300, in examples using candidate acceleration values, associated determined jerk values, and jerk constraints as described above.

Figure 4:
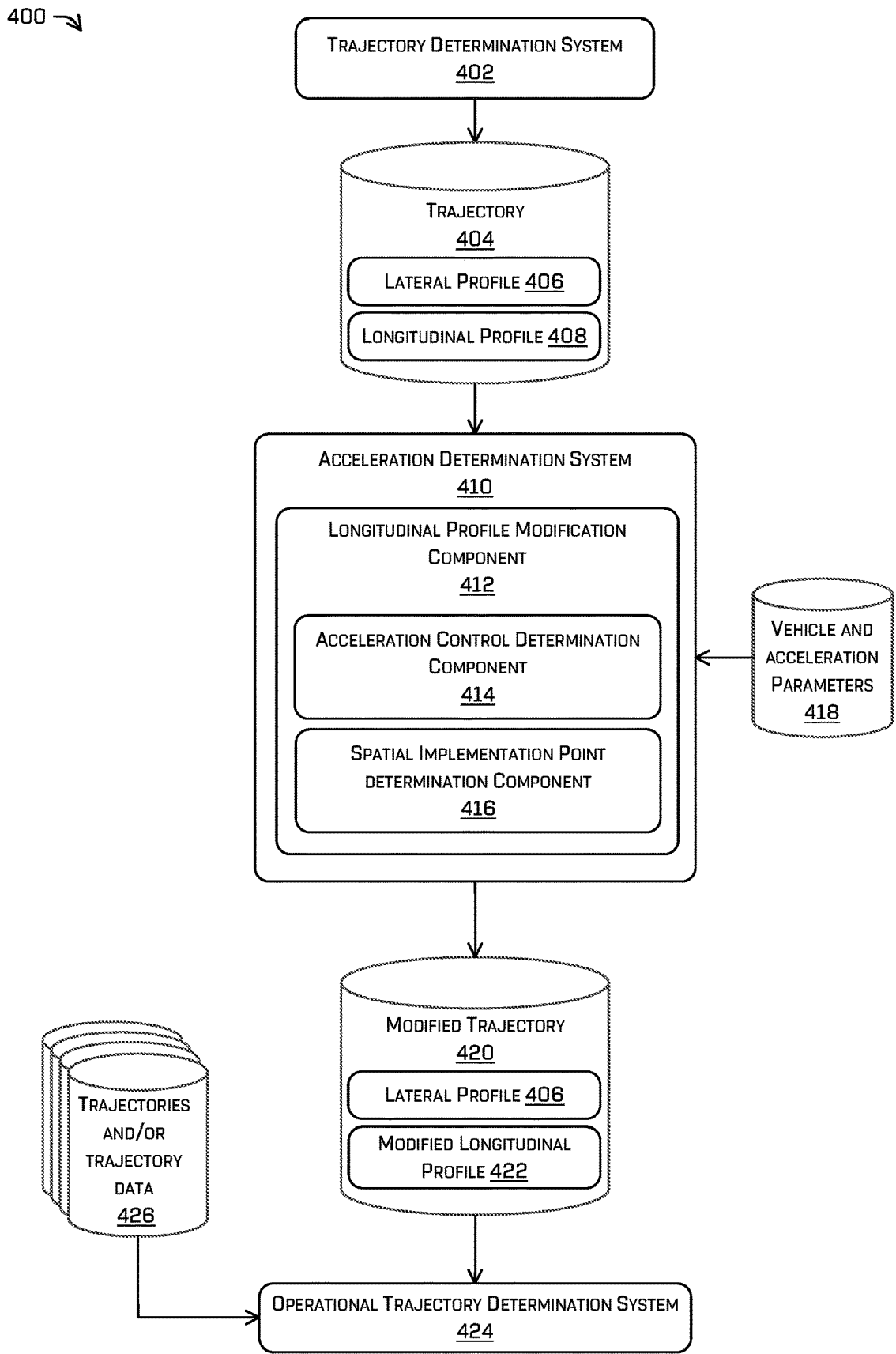
FIG. 4 is a block diagram of an example trajectory determination system, in accordance with examples of the disclosure.
Figure 5:
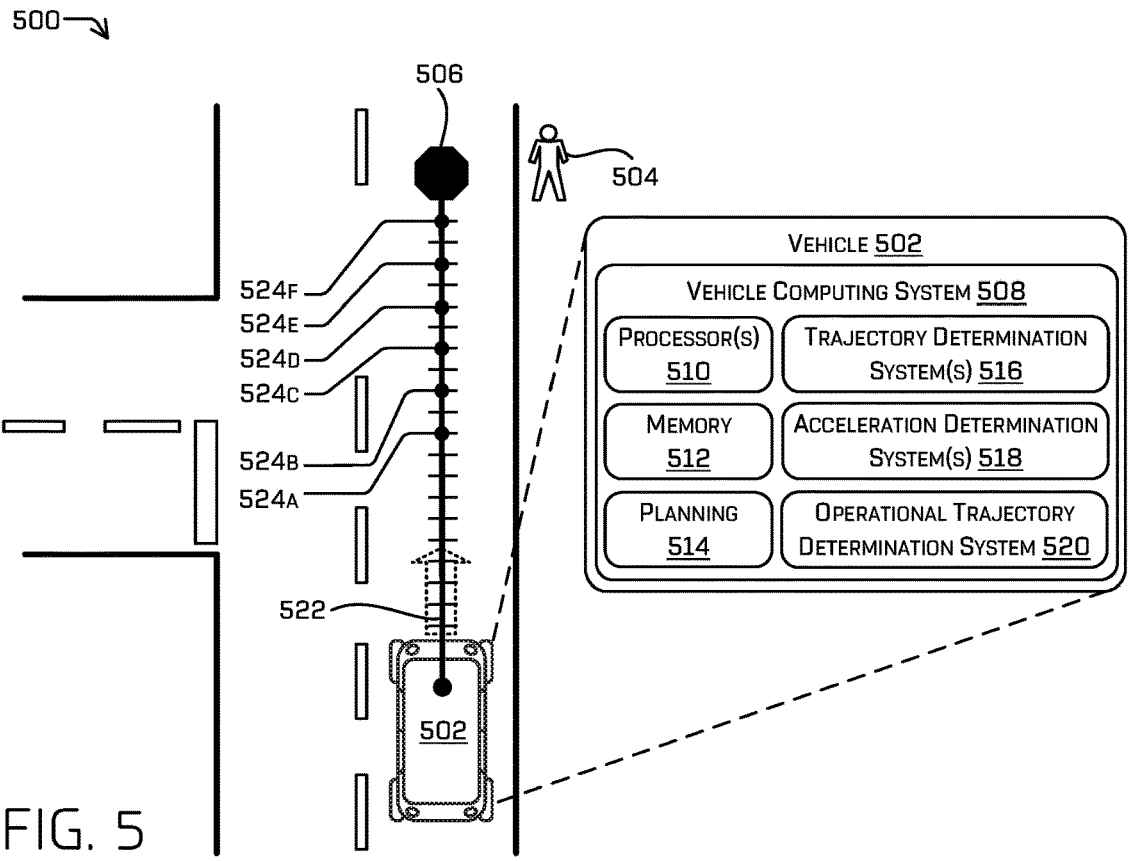
FIG. 5 depicts a block diagram representing an example vehicle, environment, trajectory, and acceleration controls, in accordance with examples of the disclosure.
Figure 6:
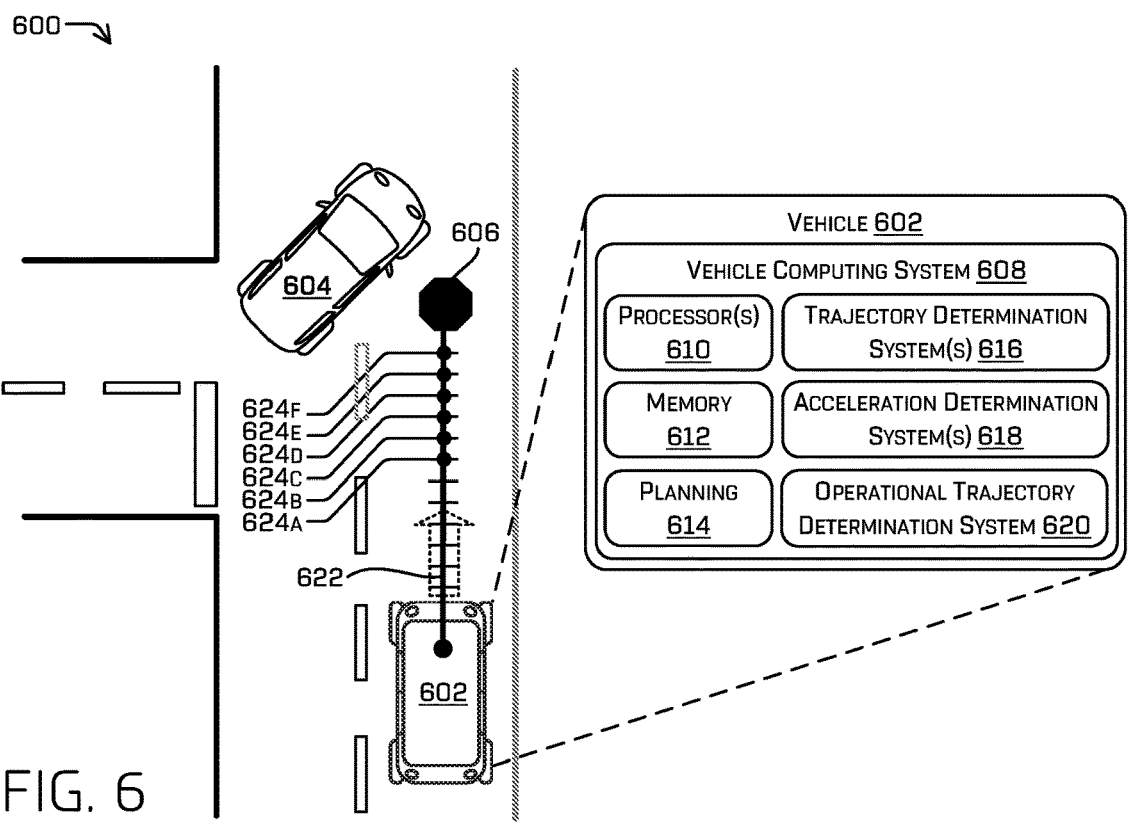
FIG. 6 depicts a block diagram representing an example vehicle, environment, trajectory, and acceleration controls, in accordance with examples of the disclosure.
Figure 7:
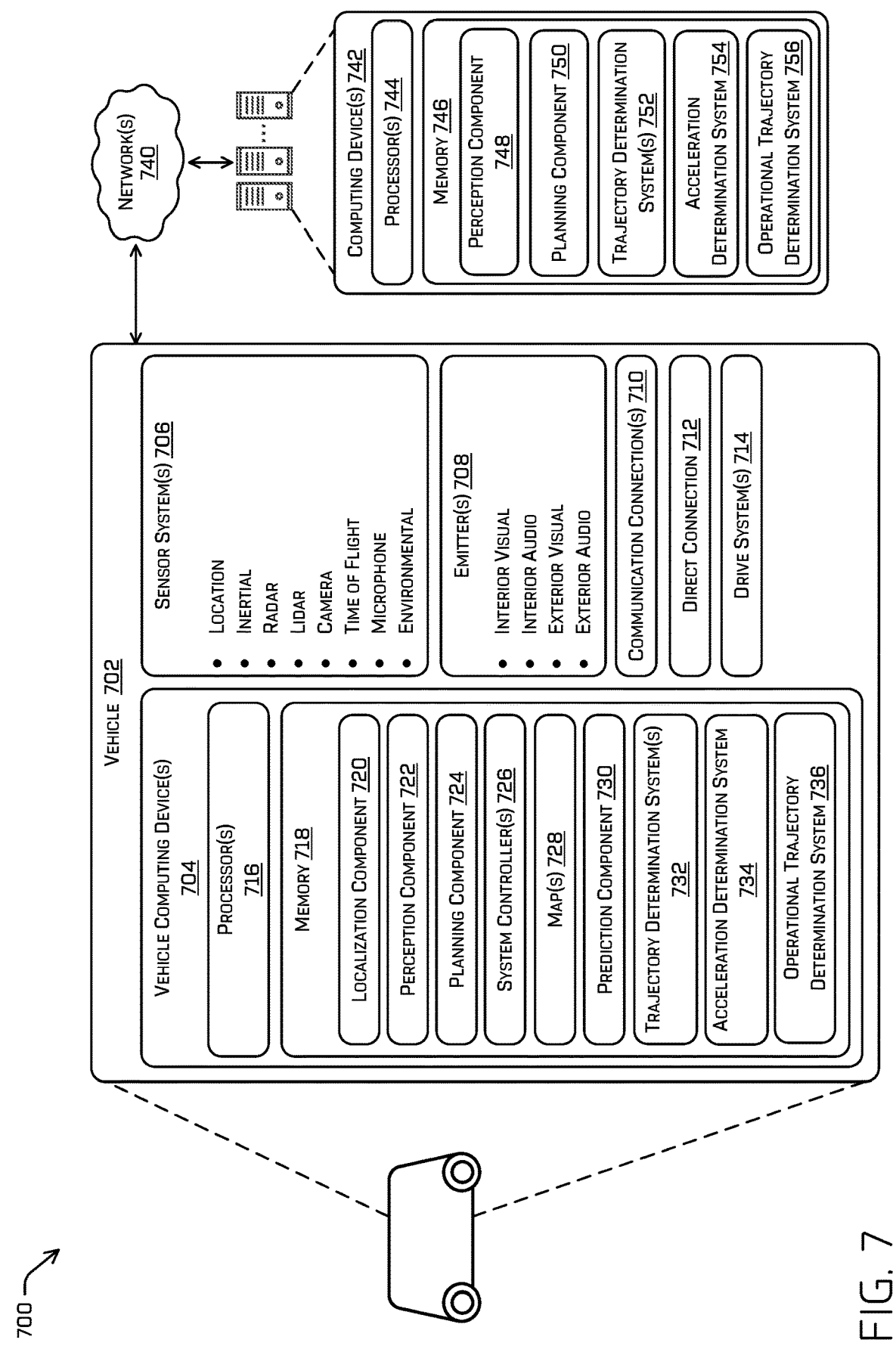
FIG. 7 depicts a block diagram of an example system for implementing the techniques described herein.

FIG. 4 is a block diagram of an operational trajectory determination system 400 according to various examples. The system 400 may be implemented at a vehicle (e.g., an autonomous vehicle) by a vehicle computing system and/or by a remote system. In various examples, the system may be implemented at, or interact with, a tracking and/or planning system that may be configured to control a vehicle and/or to provide data for use in controlling a vehicle. The system 400 may include one or more of the components and systems illustrated in FIGS. 5-7 and described below. These components may be configured as described herein or in any other configuration and may perform any subset of their associated operations in any or and/or in conjunction with other one or more other operations. For example, one or more components and systems can include those associated with trajectory determination system 516, acceleration determination system 518, and/or operational trajectory determination system 520 illustrated in FIG. 5; trajectory determination system 616, acceleration determination system 618, and/or operational trajectory determination system 620 illustrated in FIG. 6; and/or processors 716 and/or 744, memories 718 and/or 746, trajectory determination system(s) 732, acceleration determination system 734, and/or operational trajectory determination system 736 illustrated in FIG. 7. In examples, the one or more operations performed by the system 400 may be performed by a remote system in communication with a vehicle, such as trajectory determination system 752, acceleration determination system 754, and/or operational trajectory determination system 756 illustrated in FIG. 7. In still other examples, the one or more operations performed by the system 400 may be performed by a combination of a remote system and a vehicle computing system. However, the process 300 is not limited to being performed by such components and systems, and the components and systems of FIGS. 5-7 are not limited to performing the operations performed by the system 400.

In various examples, a vehicle trajectory system 400 may be configured at a vehicle and may include one or more trajectory determination systems or subsystems that may be individually configured to determine and/or generate one or more types of trajectories. For example, the vehicle trajectory system 400 may include a trajectory determination system 402 that may be configured to determine and/or generate a trajectory that may include a planned and/or unplanned stopping point. In various examples, one or more stopping points and/or one or more distances to one or more stopping points may be provided to one or more components of the vehicle trajectory system 400 by one or more other systems or components (e.g., a collision avoidance system, an obstacle detection system, etc.). The vehicle trajectory system 400 may be further configured to determine, from among multiple trajectories, a trajectory to provide to a tracking and/or planning system for use in control of a vehicle. For example, the vehicle trajectory system 400 may determine, using an acceleration determination system as described herein, multiple trajectories including updated acceleration data. The vehicle trajectory system 400 may then determine, based on such trajectories, (e.g., using an operational trajectory determination system 424) an individual trajectory to provide to a tracking and/or planning system and/or to otherwise use for vehicle control. Alternatively, the vehicle trajectory system 400 may provide all or a subset of multiple such trajectories to a tracking and/or planning system.

The trajectory determination system 402 may generate or otherwise determine one or more data structures representing a trajectory 404 associated with controlling a vehicle through an environment. For example, the trajectory 404 may be used to control a vehicle along a path of travel and may include one or more planned and/or unplanned stopping points. The trajectory 404 may include a lateral profile 406 that may include data representing directional parameters (e.g., steering controls, region of travel, etc.). The trajectory 404 may also, or instead, include a longitudinal profile 408 that may include data representing velocity parameters (e.g., acceleration, deceleration, and/or braking controls). In various examples, the longitudinal profile 408 and/or the trajectory 404 may include an indication of an expected or current position of a vehicle. The trajectory 404 may also, or instead, include data that may be used by an acceleration determination system as acceleration parameters, such as, but not limited to, data representing an expected or current vehicle velocity, an expected or current acceleration, estimated or predicted vehicle positions at one or more spatial locations and/or times, jerk constraint data, reaction duration data, etc.

In various examples, the trajectory 404 may be an operational trajectory (e.g. optimized trajectory) that has been determined by an operation trajectory determination system (e.g., system 424) and that may be provided to the trajectory system 400 for acceleration control determinations. For example, the trajectory 404 may be a trajectory determined for use in operating a vehicle and may be provided to the acceleration determination system 410 for determination of acceleration controls for the longitudinal profile 408, for example, to ensure that the vehicle comes to a stop at or before a stopping point (e.g., zero velocity point) indicated in the trajectory 404.

The trajectory determination system 402 may provide the trajectory 404 to an acceleration determination system 410 for acceleration control determination. The acceleration determination system 410 may use one or more parameters associated with the received trajectory 404 to modify a longitudinal profile 408 of the received trajectory 404 with acceleration controls. For example, a longitudinal profile modification component 412 may receive the trajectory 404 and determine one or more acceleration controls based on the trajectory (e.g., trajectory segments) and/or one or more other parameters, such as one or more acceleration parameters (e.g . . . jerk constraints) and/or expected or current vehicle state parameters (e.g., expected velocity, expected acceleration, expected position, etc.). The longitudinal profile modification component 412 may also, or instead, determine or obtain one or more vehicle and/or acceleration parameters 418 for acceleration control determination from one or more other sources (e.g., from one or more other vehicle computing system components and/or data sources, such as vehicle capability and/or condition data, environmental condition data, weather condition data, etc.).

An acceleration control determination component 414 may use such parameters to determine particular acceleration controls to be implemented at a vehicle to, for example, slow the vehicle to a stop at an acceptable deceleration rate along the path of travel indicated in the trajectory 404. A spatial implementation point determination component 416 may use such parameters to determine and/or insert particular spatial points along the path of travel indicated in the trajectory 404 at which the controls determined by the acceleration control determination component 414 may be implemented. As will be appreciated, the operations performed by these components may be interrelated. Accordingly, these component may perform such operations separately or as a single component providing the combined functionality of the acceleration control determination component 414 and the implementation point determination component 416.

For example, the acceleration control determination component 414 may determine, based on parameters such as an expected vehicle velocity, an expected vehicle acceleration, jerk constraints, distance to a stopping point, segment lengths, etc., that a particular number of incremental acceleration decreases (deceleration increases) of a particular amount of deceleration may be used to decelerate the vehicle and ultimately to bring the vehicle to a stop at a particular stopping point (e.g., five deceleration increases of −1 m/s² per increase) while remaining within the bounds of the jerk constraints and within the capabilities of the vehicle. The spatial implementation point determination component 416 may determine the spatial locations of the points along the path of travel represented in the trajectory 404 at which such deceleration increases may be implemented (e.g., as acceleration controls). For example, the spatial implementation point determination component 416 may determine that the five deceleration increases of −1 m/s² per increase may be implemented as an acceleration control reducing the current acceleration by 1 m/s² at every other segment between the current vehicle location and a stopping point indicated in the trajectory.

The acceleration determination system 410 may use the data determined by the acceleration control determination component 414 and the spatial implementation point determination component 416 to modify the longitudinal profile 408 of the received trajectory 404 and/or to generate a new trajectory with such longitudinal profile data that otherwise substantially replicates the remaining data of the received trajectory 404. For example, the acceleration determination system 410 may modify the longitudinal profile 408 of the trajectory 404 based on data determined by the acceleration control determination component 414 and the spatial implementation point determination component 416 to determine a modified longitudinal profile 422 for a modified trajectory 420. The modified longitudinal profile 422 determined by the acceleration determination system 410 may include the acceleration controls determined by the acceleration control determination component 414 and the spatial implementation point determination component 416. The acceleration determination system 410 may determine the modified trajectory 420 to include the lateral profile 406 that may be substantially unchanged from the lateral profile of the trajectory 404. The acceleration determination system 410 may provide the modified trajectory 420 to the operational trajectory determination system 424, for example, for use as a candidate trajectory from which a trajectory for controlling a vehicle may be determined. Alternatively or additionally, where the trajectory 404 was an operational trajectory, the acceleration determination system 410 may provide the modified trajectory 420 to one or more vehicle components for us in controlling the vehicle.

The operational trajectory determination system 424 may receive the modified trajectory 420 from the acceleration determination system 410 and, in some examples, one or more other trajectories and/or other trajectory data 426 (e.g., from one or more other trajectory determination and/or modification systems). The operational trajectory determination system 424 may determine, based on detected environmental conditions, vehicle conditions, obstacles detected, sensor data, etc., an operational trajectory from among these candidate trajectories to use for controlling a vehicle. The determined operational trajectory may be provided to a planner, tracker, and/or one or more other vehicle control components.

FIG. 5 is a top-down view of an example environment 500 in which a vehicle 502 may be traveling. The vehicle 502 may be configured with a sensor system that may allow a vehicle computing system 508 configured at the vehicle 502 to collect data in the environment 500, detect objects, make various determinations, etc. The vehicle computing system 508 may include one or more processors 510, memory 512, a planning component 514, one or more trajectory determination systems 516, one or more acceleration determination systems 518, and/or an operational trajectory determination system 520.

The trajectory determination system(s) 516 may determine a trajectory 522 for operating the vehicle 502 (e.g., under normal conditions) that may include a planned path of travel through the environment 500 and one or more stopping points, such as stopping point 506. The stopping point 506 may be included in the trajectory 522 to facilitate stopping the vehicle 502 so that a passenger 504 may enter the vehicle 502. The trajectory determination system(s) 516 may provide the trajectory 522 to the acceleration determination system 518 for acceleration control determinations.

As described herein, the acceleration determination system 518 may determine one or more acceleration controls and/or associated spatial implementation points for one or more trajectories using one or more parameters. For example, the acceleration determination system 518 may use an expected or current position of the vehicle 502, a location of the stopping point 506, an expected or current velocity of the vehicle 502, an expected or current acceleration of the vehicle 502, jerk constraints associated with the vehicle 502 and/or the trajectory 522, one or more segment lengths associated with the trajectory 522, and/or one or more other parameters (e.g., as described herein in regard to FIGS. 1-3) to determine acceleration controls 524*a-f* and the associated spatial implementation points for implementing such controls along the path of travel represented in the trajectory 522.

The acceleration determination system 518 may modify the trajectory 522 to include, or otherwise based on, the acceleration controls 524*a-f* and provide this updated trajectory 522 to the operational trajectory determination system 520 for consideration as an operational trajectory for use in controlling the vehicle 502. The acceleration determination system 518 may also, or instead, determine another trajectory based on the trajectory 522 to include the acceleration controls 524*a-f* and provide that trajectory to the operational trajectory determination system 520 for consideration as an operational trajectory for use in controlling the vehicle 502.

The operational trajectory determination system 520 may determine, from available candidate trajectories that may include an updated trajectory 522 and/or one or more other trajectories based on the trajectory 522, an operational trajectory to use for controlling the vehicle 502 through the environment 500. If determined as an operational trajectory, the updated trajectory 522 (or another trajectory that includes the acceleration controls 524*a-f*) may be used to control the vehicle 502, including by increasing deceleration (decreasing acceleration) within the bounds of the applicable jerk constraints at the individual spatial implementation points associated with the acceleration controls 524*a-f* to stop the vehicle 502 at or before the stopping point 506.

FIG. 6 is a top-down view of another example environment 600 in which a vehicle 602 may be traveling. The vehicle 602 may be configured with a sensor system that may allow a vehicle computing system 608 configured at the vehicle 602 to collect data in the environment 600, detect objects, make various determinations, etc. The vehicle 602 may be sharing a road with other vehicles, such as vehicle 604 that may be unexpectedly entering the lane in which the vehicle 602 is traveling and that the vehicle 602 may detect, for example using sensor data generated by one or more sensors configured at the vehicle 602. The vehicle computing system 608 may include one or more processors 610, memory 612, a planning component 614, one or more trajectory determination systems 616, one or more acceleration determination systems 618, and/or an operational trajectory determination system 620.

The trajectory determination system(s) 616 may determine a trajectory 622 for operating the vehicle 602 (e.g., based on detected and/or unexpected conditions) that may include a path of travel through the environment 500 and one or more unplanned stopping points, such as stopping point 606. The stopping point 606 may be included in the trajectory 622 to facilitate stopping the vehicle 602 prior to intersecting with the vehicle 604 (e.g., to avoid a potential collision with the vehicle 604). For example, the trajectory determination system(s) 616 may be a collision avoidance trajectory determination system and/or one or more other systems configured to generate trajectories that address unexpected and/or unplanned events. The trajectory determination system(s) 616 may provide the trajectory 622 to the acceleration determination system 618 for acceleration control determinations.

As described herein, the acceleration determination system 618 may determine one or more acceleration controls and/or associated spatial implementation points for one or more trajectories using one or more parameters. For example, the acceleration determination system 618 may use an expected or current position of the vehicle 602, a location of the stopping point 606, an expected or current velocity of the vehicle 602, an expected or current acceleration of the vehicle 602, jerk constraints associated with the vehicle 602 and/or the trajectory 622, one or more segment lengths associated with the trajectory 622, and/or one or more other parameters (e.g., as described herein in regard to FIGS. 1-3) to determine acceleration controls 624*a-f* and the associated spatial implementation points for implementing such controls along the path of travel represented in the trajectory 622.

The acceleration determination system 618 may modify the trajectory 622 to include, or otherwise based on, the acceleration controls 624*a-f* and provide this updated trajectory 622 to the operational trajectory determination system 620 for consideration as an operational trajectory for use in controlling the vehicle 602. The acceleration determination system 618 may also, or instead, determine another trajectory based on the trajectory 622 to include the acceleration controls 624*a-f* and provide that trajectory to the operational trajectory determination system 620 for consideration as an operational trajectory for use in controlling the vehicle 602.

The operational trajectory determination system 620 may determine, from available candidate trajectories that may include an updated trajectory 622 and/or one or more other trajectories based on the trajectory 622, an operational trajectory to use for controlling the vehicle 602 through the environment 600. If determined as an operational trajectory, the updated trajectory 622 (or another trajectory that includes the acceleration controls 624*a-f*) may be used to control the vehicle 602, including by increasing deceleration (decreasing acceleration) within the bounds of the applicable jerk constraints at the individual spatial implementation points associated with the acceleration controls 624*a-f* to stop the vehicle 602 at or before the stopping point 606.

FIG. 7 depicts a block diagram of an example system 700 for implementing the techniques described herein. In at least one example, the system 700 can include a vehicle 702. The vehicle 702 can include a vehicle computing system or device 704 that may function as and/or perform the functions of a vehicle controller for the vehicle 702. The vehicle 702 can also include one or more sensor systems 706, one or more emitters 708, one or more communication connections 710, at least one direct connection 712, and one or more drive systems 714.

The vehicle computing device 704 can include one or more processors 716 and memory 718 communicatively coupled with the one or more processors 716. In the illustrated example, the vehicle 702 is an autonomous vehicle; however, the vehicle 702 could be any other type of vehicle. In the illustrated example, the memory 718 of the vehicle computing device 704 stores a localization component 720, a perception component 722, a planning component 724, one or more system controllers 726, one or more maps 728, a prediction component 730, one or more trajectory determination systems 732, an acceleration determination system 734, and/or the operational trajectory determination system 736. Though depicted in FIG. 7 as residing in memory 718 for illustrative purposes, it is contemplated that each of the localization component 720, the perception component 722, the planning component 724, the one or more system controllers 726, the one or more maps 728, the prediction component 730, the trajectory determination system(s) 732, the acceleration determination system 734, and/or an operational trajectory determination system 736 can additionally, or alternatively, be accessible to the vehicle 702 (e.g., stored remotely). Alternatively or additionally, the trajectory determination system(s) 732, the acceleration determination system 734, and/or the operational trajectory determination system 736 may be a component of and/or associated with a remote computing device and/or a separate (e.g., secondary) computing device. Examples of systems and methods for using a secondary computing device as trajectory determination system are provided in U.S. patent application Ser. No. 17/514,542, filed Oct. 29, 2021, entitled "Collision Avoidance and Mitigation in Autonomous Vehicles," the entirety of which is incorporated herein by reference for all purposes.

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 720 can provide data to various components of the vehicle 702 to determine an initial position of an autonomous vehicle for generating a trajectory and/or for generating map data, as discussed herein.

In some instances, the perception component 722 can include functionality to perform object detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 722 can provide processed sensor data that indicates one or more characteristics associated with a detected entity (e.g., a tracked object) and/or the environment in which the entity is positioned. The perception component 722 may use multichannel data structures, such as multichannel data structures generated by a deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure as described herein (e.g., a multichannel data structure generated as output of one or more deconvolution layers (e.g., learned deconvolutional upsampling decoding layer(s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc.

In general, the planning component 724 can determine a path for the vehicle 702 to follow to traverse through an environment. In examples, the planning component 724 can determine various routes and trajectories and various levels of detail. For example, the planning component 724 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 724 can generate an instruction for guiding the autonomous vehicle along at least a portion of the route from the first location to the second location. In at least one example, the planning component 724 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 702 to navigate.

In at least one example, the vehicle computing device 704 can include one or more system controllers 726, which can be configured to control steering, propulsion, braking, safety, emitters, communication, and other systems of the vehicle 702. These system controller(s) 726 can communicate with and/or control corresponding systems of the drive system(s) 714 and/or other components of the vehicle 702.

The memory 718 can further include one or more maps 728 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 728 can include at least one map (e.g., images and/or a mesh). In some examples, the vehicle 702 can be controlled based at least in part on the maps 728. That is, the maps 728 can be used in connection with the localization component 720, the perception component 722, and/or the planning component 724 to determine a location of the vehicle 702, identify objects in an environment, and/or generate routes and/or trajectories to navigate within an environment.

In some examples, the one or more maps 728 can be stored on a remote computing device(s) (such as the computing device(s) 742) accessible via network(s) 740. In some examples, multiple maps 728 can be stored based on, for example, a characteristic (e.g., type of entity, time of day, day of week, season of the year, etc.). Storing multiple maps 728 can have similar memory requirements but increase the speed at which data in a map can be accessed.

In general, the prediction component 730 can generate predicted trajectories of objects in an environment. For example, the prediction component 730 can generate one or more predicted trajectories for vehicles, pedestrians, animals, and the like within a threshold distance from the vehicle 702. In some instances, the prediction component 730 can measure a trace of an object and generate a trajectory for the object based on observed and predicted behavior. The prediction component 730 may interact with the trajectory determination system(s) 732, the acceleration determination system 734, and/or the operational trajectory determination system 736 to determine an operational trajectory, for example, based on one or more candidate trajectories.

In some instances, aspects of some or all of the components discussed herein can include any models, algorithms, and/or machine learning algorithms. For example, in some instances, the components in the memory 718 (and the memory 746, discussed below) can be implemented as a neural network. For instance, the memory 718 may include a deep tracking network that may be configured with a convolutional neural network (CNN). The CNN may include one or more convolution/deconvolution layers. Alternatively, or in addition, the one or more trajectory determination systems 732, the acceleration determination system 734, and/or the operational trajectory determination system 736 may include or be implemented by a CNN that may perform operations as described herein.

An example neural network is an algorithm that passes input data through a series of connected layers to produce an output. Each layer in a neural network can also comprise another neural network or can comprise any number of layers, each of which may convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a braking trajectory. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 706 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, acoustic sensors, microphones, wheel encoders, environment sensors (e.g., temperature sensors, humidity sensors, light sensors, pressure sensors, etc.), etc. The sensor system(s) 706 can include multiple instances of each of these or other types of sensors. For instance, the camera sensors can include multiple cameras disposed at various locations about the exterior and/or interior of the vehicle 702. The sensor system(s) 706 can provide input to the vehicle computing device 704. Additionally, or alternatively, the sensor system(s) 706 can send sensor data, via the one or more networks 740, to the one or more computing device(s) at a particular frequency, after a lapse of a predetermined period of time, in near real-time, etc.

The vehicle 702 can also include one or more emitters 708 for emitting light (visible and/or non-visible) and/or sound. The emitter(s) 708 in an example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device 704 to another computing device or a network, such as network(s) 740. For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 can include one or more drive systems 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor systems to detect conditions of the drive system(s) 714 and/or the surroundings of the vehicle 702. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 714. Furthermore, the drive system(s) 714 may also include one or more communication connection(s) that enable communication by the respective drive system with one or more other local or remote computing device(s).

In at least one example, the direct connection 712 can provide a physical interface to couple the one or more drive system(s) 714 with the body of the vehicle 702. For example, the direct connection 712 can allow the transfer of energy, fluids, air, data, etc. between the drive system(s) 714 and the vehicle. In some instances, the direct connection 712 can further releasably secure the drive system(s) 714 to the body of the vehicle 702.

In some examples, the vehicle 702 can send sensor data, audio data, collision data, and/or other types of data to one or more computing device(s) 742 via the network(s) 740. In some examples, the vehicle 702 can send raw sensor data to the computing device(s) 742. In other examples, the vehicle 702 can send processed sensor data and/or representations of sensor data (e.g., multichannel data structures representing sensor data) to the computing device(s) 742. In some examples, the vehicle 702 can send sensor data to the computing device(s) 742 at a particular frequency, after a lapse of a predetermined period of time, in near real-time, etc. In some cases, the vehicle 702 can send sensor data (raw or processed) to the computing device(s) 742 as one or more log files.

The computing device(s) 742 can include processor(s) 744 and a memory 746 storing one or more perception components 748, planning components 750, one or more trajectory determination systems 752, an acceleration determination system 754, and/or an operational trajectory determination system 756. In some instances, the one or more trajectory determination systems 752, the acceleration determination system 754, and/or the operational trajectory determination system 756 can substantially correspond to the one or more trajectory determination systems 732, the acceleration determination system 734, and the operational trajectory determination system 736 respectively, and can include substantially similar functionality. In some instances, the perception component 748 can substantially correspond to the perception component 722 and can include substantially similar functionality. In some instances, the planning component 750 can substantially correspond to the planning component 724 and can include substantially similar functionality.

The processor(s) 716 of the vehicle 702 and the processor(s) 744 of the computing device(s) 742 can be any suitable processor capable of executing instructions to process data and perform operations as described herein. By way of example and not limitation, the processor(s) 716 and 744 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 746 are examples of non-transitory computer-readable media. The memory 718 and 746 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 7 is illustrated as a distributed system, in alternative examples, components of the vehicle 702 can be associated with the computing device(s) 742 and/or components of the computing device(s) 742 can be associated with the vehicle 702. That is, the vehicle 702 can perform one or more of the functions associated with the computing device(s) 742, and vice versa.

Example Clauses

The following paragraphs describe various examples. Any of the examples in this section may be used with any other of the examples in this section and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving a trajectory for a vehicle to traverse through an environment; determining a plurality of spatial implementation points along the trajectory, a spatial implementation point of the plurality of spatial implementation points indicative of a decision point for modifying a vehicle control associated with the trajectory; determining, for a first spatial implementation point of the plurality of spatial implementation points and based at least in part on a length of a trajectory segment associated with the first spatial implementation point, an expected vehicle velocity, an expected vehicle acceleration, an acceleration rate change constraint, and a candidate vehicle acceleration, a first acceleration control associated with a first deceleration; determining a modified trajectory by modifying a longitudinal profile associated with the trajectory based at least in part on the first acceleration control and the first spatial implementation point; and causing the vehicle to be controlled in accordance with the modified trajectory.

B: The system of paragraph A, wherein determining the first acceleration control is further based at least in part on a difference between the candidate vehicle acceleration and the expected vehicle acceleration.

C: The system of paragraph A or B, wherein: the acceleration rate change constraint comprises an acceleration rate change upper bound and an acceleration rate change lower bound: determining the first acceleration control comprises: determining an acceleration change based at least in part on the candidate vehicle acceleration and the expected vehicle acceleration; and determining that the acceleration change is greater than or equal to the acceleration rate change lower bound and less than or equal to the acceleration rate change upper bound; and determining the modified trajectory is further based at least in part on determining that the acceleration rate change is greater than or equal to the acceleration rate change lower bound and less than or equal to the acceleration rate change upper bound.

D: The system of any of paragraphs A-C, wherein the length of the trajectory segment comprises a spatial distance between the first spatial implementation point and a second spatial implementation point of the plurality of spatial implementation points.

E: The system of any of paragraphs A-D, wherein the operations further comprise: determining, for a second spatial implementation point of the plurality of spatial implementation points and based at least in part on the length of the trajectory segment, a predicted vehicle velocity associated with the first spatial implementation point, a predicted vehicle acceleration associated with the first spatial implementation point, the acceleration rate change constraint, and a second candidate vehicle acceleration, a second acceleration control associated with a second deceleration; and determining the modified trajectory by further modifying the longitudinal profile associated with the trajectory based at least in part on the second acceleration control and the second spatial implementation point.

F: One or more non-transitory computer-readable media storing instructions that, when executed by one or more processors, perform operations comprising: receiving a trajectory for a vehicle to traverse through an environment, the trajectory comprising a set of accelerations associated with a set of spatial locations along the trajectory; determining a spatial implementation point along a region of travel associated with the trajectory indicative of a point at which to modify a proposed vehicle control; determining, for the spatial implementation point and based at least in part on a spatial trajectory segment length, an acceleration rate change parameter, and a candidate vehicle acceleration, an acceleration modification; determining, as a modified trajectory, to modify an acceleration control of the trajectory associated with the spatial implementation point based at least in part on the acceleration modification; and causing the vehicle to be controlled based at least in part on the modified trajectory.

G: The one or more non-transitory computer-readable media of paragraph F, wherein the spatial implementation point is determined based at least in part on one or more of: a stopping point represented in the trajectory; a location of the vehicle; or a distance from the location of the vehicle to a location of the stopping point.

H: The one or more non-transitory computer-readable media of paragraph F or G, wherein: the trajectory comprises a stopping point associated with a detection of an object in the environment; the acceleration rate change parameter is determined based on the detection of the object; and the spatial implementation point is determined based at least in part on the stopping point.

I: The one or more non-transitory computer-readable media of any of paragraphs F-H, wherein determining the acceleration modification is further based at least in part on an expected vehicle operational parameter.

J: The one or more non-transitory computer-readable media of any of paragraphs F-I, wherein causing the vehicle to be controlled based at least in part on the modified trajectory comprises: determining a plurality of trajectories comprising the modified trajectory; and determining the modified trajectory further based at least in part on the plurality of trajectories; and using the modified trajectory as an operational trajectory to control the vehicle.

K: The one or more non-transitory computer-readable media of any of paragraphs F-J wherein: the trajectory comprises a stopping point: the operations further comprise: determining a vehicle velocity at the stopping point; and determining acceleration control validation data based at least in part on the vehicle velocity at the stopping point.

L: The one or more non-transitory computer-readable media of paragraph K, wherein determining the acceleration control validation data comprises one of: determining that the acceleration modification is valid based at least in part on determining that the vehicle velocity at the stopping point is zero; or determining that the acceleration modification is invalid based at least in part on determining that the vehicle velocity at the stopping point is non-zero.

M: The one or more non-transitory computer-readable media of any of paragraphs F-L, wherein the operations further comprise: determining a second spatial implementation point along the region of travel: determining a predicted vehicle operational parameter based at least in part on the acceleration modification; determining a second acceleration modification based at least in part on the predicted vehicle operational parameter, the spatial trajectory segment length, the acceleration rate change parameter, and a second candidate vehicle acceleration; and determining, as the modified trajectory, to modify a second acceleration control of the trajectory associated with the second spatial implementation point based at least in part on the second acceleration modification.

N: The one or more non-transitory computer-readable media of any of paragraphs F-M, wherein the acceleration rate change parameter is based at least in part on an urgency parameter associated with a stopping point represented in the trajectory.

O: A method comprising: receiving a trajectory for a vehicle to traverse through an environment; determining a spatial implementation point along a region of travel associated with the trajectory indicative of a point at which to determine a vehicle control; determining, for the spatial implementation point and based at least in part on a vehicle operational parameter, a spatial trajectory parameter, an acceleration rate change parameter, and a candidate vehicle acceleration, a deceleration control; determining, as a modified trajectory, to modify an acceleration control of the trajectory at the spatial implementation point based at least in part on the deceleration control; and providing the modified trajectory to an operational trajectory determination system configured to determine an operational trajectory for controlling the vehicle.

P: The method of paragraph O, further comprising: determining a second spatial implementation point along the region of travel: determining a predicted vehicle operational parameter based at least in part on the deceleration control; determining a second deceleration control based at least in part on the predicted vehicle operational parameter, the spatial trajectory parameter, the acceleration rate change parameter, and a second candidate vehicle acceleration; and determining, as the modified trajectory, to modify a second acceleration control of the trajectory at the second spatial implementation point based at least in part on the second deceleration control.

Q: The method of paragraph P, wherein determining the predicted vehicle operational parameter comprises one or more of: determining a predicated vehicle velocity based at least in part on the deceleration control and an expected vehicle velocity; or determining a predicated vehicle acceleration based at least in part on the deceleration control and an expected vehicle acceleration.

R: The method of paragraph P, wherein: the predicted vehicle operational parameter comprises a predicted vehicle acceleration; and determining the second deceleration control is further based at least in part on a difference between the second candidate vehicle acceleration and the predicted vehicle acceleration.

S: The method of paragraph P, wherein the spatial trajectory parameter comprises a trajectory segment length comprising a spatial distance between the spatial implementation point and the second spatial implementation point.

T: The method of any of paragraphs O-S, wherein: the vehicle operational parameter comprises an expected vehicle acceleration; and determining the deceleration control comprises: determining an acceleration rate change based at least in part on the candidate vehicle acceleration and the expected vehicle acceleration; and determining that the acceleration rate change less than a threshold acceleration rate change associated with the acceleration rate change parameter.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving a trajectory for a vehicle to traverse through an environment;
determining a plurality of spatial implementation points along the trajectory, a spatial implementation point of the plurality of spatial implementation points indicative of a decision point for modifying a vehicle control associated with the trajectory;
determining, for a first spatial implementation point of the plurality of spatial implementation points and based at least in part on a length of a trajectory segment associated with the first spatial implementation point, an expected vehicle velocity, an expected vehicle acceleration, an acceleration rate change constraint, and a candidate vehicle acceleration, a first acceleration control associated with a first deceleration;
determining a modified trajectory by modifying a longitudinal profile associated with the trajectory based at least in part on the first acceleration control and the first spatial implementation point; and
causing the vehicle to be controlled in accordance with the modified trajectory.

2. The system of claim 1, wherein determining the first acceleration control is further based at least in part on a difference between the candidate vehicle acceleration and the expected vehicle acceleration.

3. The system of claim 1, wherein:
the acceleration rate change constraint comprises an acceleration rate change upper bound and an acceleration rate change lower bound;
determining the first acceleration control comprises:
determining an acceleration change based at least in part on the candidate vehicle acceleration and the expected vehicle acceleration; and
determining that the acceleration change is greater than or equal to the acceleration rate change lower bound and less than or equal to the acceleration rate change upper bound; and
determining the modified trajectory is further based at least in part on determining that the acceleration rate change is greater than or equal to the acceleration rate change lower bound and less than or equal to the acceleration rate change upper bound.

4. The system of claim 1, wherein the length of the trajectory segment comprises a spatial distance between the first spatial implementation point and a second spatial implementation point of the plurality of spatial implementation points.

5. The system of claim 1, wherein the operations further comprise:
determining, for a second spatial implementation point of the plurality of spatial implementation points and based at least in part on the length of the trajectory segment, a predicted vehicle velocity associated with the first spatial implementation point, a predicted vehicle acceleration associated with the first spatial implementation point, the acceleration rate change constraint, and a second candidate vehicle acceleration, a second acceleration control associated with a second deceleration; and
determining the modified trajectory by further modifying the longitudinal profile associated with the trajectory based at least in part on the second acceleration control and the second spatial implementation point.

6. One or more non-transitory computer-readable media storing instructions that, when executed by one or more processors, perform operations comprising:
receiving a trajectory for a vehicle to traverse through an environment, the trajectory comprising a set of accelerations associated with a set of spatial locations along the trajectory;

determining a spatial implementation point along a region of travel associated with the trajectory indicative of a point at which to modify a proposed vehicle control;

determining, for the spatial implementation point and based at least in part on a spatial trajectory segment length, an acceleration rate change parameter, and a candidate vehicle acceleration, an acceleration modification;

determining, as a modified trajectory, to modify an acceleration control of the trajectory associated with the spatial implementation point based at least in part on the acceleration modification; and causing the vehicle to be controlled based at least in part on the modified trajectory.

7. The one or more non-transitory computer-readable media of claim 6, wherein the spatial implementation point is determined based at least in part on one or more of:
a stopping point represented in the trajectory;
a location of the vehicle; or
a distance from the location of the vehicle to a location of the stopping point.

8. The one or more non-transitory computer-readable media of claim 6, wherein:
the trajectory comprises a stopping point associated with a detection of an object in the environment;
the acceleration rate change parameter is determined based on the detection of the object; and
the spatial implementation point is determined based at least in part on the stopping point.

9. The one or more non-transitory computer-readable media of claim 6, wherein determining the acceleration modification is further based at least in part on an expected vehicle operational parameter.

10. The one or more non-transitory computer-readable media of claim 6, wherein causing the vehicle to be controlled based at least in part on the modified trajectory comprises:
determining a plurality of trajectories comprising the modified trajectory; and
determining the modified trajectory further based at least in part on the plurality of trajectories; and
using the modified trajectory as an operational trajectory to control the vehicle.

11. The one or more non-transitory computer-readable media of claim 6, wherein:
the trajectory comprises a stopping point;
the operations further comprise:
determining a vehicle velocity at the stopping point; and
determining acceleration control validation data based at least in part on the vehicle velocity at the stopping point.

12. The one or more non-transitory computer-readable media of claim 11, wherein determining the acceleration control validation data comprises one of:
determining that the acceleration modification is valid based at least in part on determining that the vehicle velocity at the stopping point is zero; or
determining that the acceleration modification is invalid based at least in part on determining that the vehicle velocity at the stopping point is non-zero.

13. The one or more non-transitory computer-readable media of claim 6, wherein the operations further comprise:
determining a second spatial implementation point along the region of travel;
determining a predicted vehicle operational parameter based at least in part on the acceleration modification;
determining a second acceleration modification based at least in part on the predicted vehicle operational parameter, the spatial trajectory segment length, the acceleration rate change parameter, and a second candidate vehicle acceleration; and
determining, as the modified trajectory, to modify a second acceleration control of the trajectory associated with the second spatial implementation point based at least in part on the second acceleration modification.

14. The one or more non-transitory computer-readable media of claim 6, wherein the acceleration rate change parameter is based at least in part on an urgency parameter associated with a stopping point represented in the trajectory.

15. A method comprising:
receiving a trajectory for a vehicle to traverse through an environment;
determining a spatial implementation point along a region of travel associated with the trajectory indicative of a point at which to determine a vehicle control;
determining, for the spatial implementation point and based at least in part on a vehicle operational parameter, a spatial trajectory parameter, an acceleration rate change parameter, and a candidate vehicle acceleration, a deceleration control;
determining, as a modified trajectory, to modify an acceleration control of the trajectory at the spatial implementation point based at least in part on the deceleration control; and
providing the modified trajectory to an operational trajectory determination system configured to determine an operational trajectory for controlling the vehicle.

16. The method of claim 15, further comprising:
determining a second spatial implementation point along the region of travel;
determining a predicted vehicle operational parameter based at least in part on the deceleration control;
determining a second deceleration control based at least in part on the predicted vehicle operational parameter, the spatial trajectory parameter, the acceleration rate change parameter, and a second candidate vehicle acceleration; and
determining, as the modified trajectory, to modify a second acceleration control of the trajectory at the second spatial implementation point based at least in part on the second deceleration control.

17. The method of claim 16, wherein determining the predicted vehicle operational parameter comprises one or more of:
determining a predicated vehicle velocity based at least in part on the deceleration control and an expected vehicle velocity; or
determining a predicated vehicle acceleration based at least in part on the deceleration control and an expected vehicle acceleration.

18. The method of claim 16, wherein:
the predicted vehicle operational parameter comprises a predicted vehicle acceleration; and
determining the second deceleration control is further based at least in part on a difference between the second candidate vehicle acceleration and the predicted vehicle acceleration.

19. The method of claim 16, wherein the spatial trajectory parameter comprises a trajectory segment length comprising a spatial distance between the spatial implementation point and the second spatial implementation point.

20. The method of claim 15, wherein:
the vehicle operational parameter comprises an expected vehicle acceleration; and
determining the deceleration control comprises:
   determining an acceleration rate change based at least in part on the candidate vehicle acceleration and the expected vehicle acceleration; and
   determining that the acceleration rate change less than a threshold acceleration rate change associated with the acceleration rate change parameter.

* * * * *